(12) United States Patent
Roche et al.

(10) Patent No.: US 7,216,635 B1
(45) Date of Patent: May 15, 2007

(54) EVAPORATIVE EMISSION CONTROLS IN A FUEL SYSTEM

(75) Inventors: Ronald H. Roche, Cass City, MI (US); Mark S. Swanson, Cass City, MI (US); John C. Woody, Caro, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 110 days.

(21) Appl. No.: 10/955,133

(22) Filed: Sep. 30, 2004

(51) Int. Cl.
*F02M 37/20* (2006.01)
(52) U.S. Cl. ............ 123/516; 123/198 D; 123/198 DB
(58) Field of Classification Search ......... 123/198 DB, 123/516, 198 D, 518, 519, 520, 521; 137/907; 251/61
See application file for complete search history.

(56) References Cited

U.S. PATENT DOCUMENTS

| | | | |
|---|---|---|---|
| 2,009,109 A | 7/1935 | Hunt | |
| 3,601,107 A | 8/1971 | Rohrbacher | |
| 3,618,581 A | 11/1971 | Simonet | |
| 3,952,719 A * | 4/1976 | Fenton et al. | 123/198 DB |
| 4,035,994 A | 7/1977 | Hoff | |
| 4,077,381 A | 3/1978 | Firey | |
| 4,111,176 A | 9/1978 | Fenton et al. | |
| 4,181,254 A * | 1/1980 | Yoshihiro et al. | 236/87 |
| 4,254,064 A | 3/1981 | Bernauer et al. | |
| 4,277,424 A | 7/1981 | Shivers, Jr. | |
| 4,520,772 A * | 6/1985 | Scott et al. | 123/198 DB |
| 4,779,755 A * | 10/1988 | Harris | 220/203.21 |
| 5,092,295 A | 3/1992 | Kobayashi | |
| 5,259,412 A * | 11/1993 | Scott et al. | 137/588 |
| 5,375,633 A * | 12/1994 | Bucci | 141/59 |
| 5,394,840 A * | 3/1995 | Phelps | 123/73 C |
| 5,524,592 A * | 6/1996 | Woody et al. | 123/510 |
| 5,579,802 A | 12/1996 | Tuckey | |
| 5,592,963 A | 1/1997 | Bucci et al. | |
| 5,673,670 A * | 10/1997 | Powell et al. | 123/463 |
| 5,682,845 A | 11/1997 | Woody | |
| 5,906,189 A | 5/1999 | Mukai et al. | |
| 6,082,323 A | 7/2000 | Winberg | |
| 6,213,083 B1 | 4/2001 | Winberg | |
| 6,401,685 B1 | 6/2002 | Warner | |
| 6,402,124 B1 | 6/2002 | Pattullo et al. | |
| 6,450,152 B1 | 9/2002 | Everingham | |
| 6,499,472 B2 | 12/2002 | Weldon et al. | |

(Continued)

OTHER PUBLICATIONS

Brochure of Walbro Engine Management LCC, "The Regulator", vol. 1, Issue 1, Handheld and Lawn & Garden, Fall 2002, 9 pgs.

*Primary Examiner*—Carl S. Miller
(74) *Attorney, Agent, or Firm*—Reising, Ethington, Barnes, Kisselle, P.C.

(57) ABSTRACT

A method, fuel system, and components for facilitating the delivery of liquid fuel from a fuel tank in fluid communication with a float bowl carburetor of an internal combustion engine, wherein evaporative emissions of the fuel from the fuel tank and float bowl carburetor are mitigated. During operation of the engine, fluid communication is permitted between the fuel tank and the carburetor, and fuel vapors at a predetermined threshold superatmospheric pressure are permitted to vent outwardly from the fuel tank. During inoperation of the engine, fluid communication is prevented between the fuel tank and the carburetor, and fuel vapors at a predetermined threshold superatmospheric pressure are permitted to vent outwardly from the fuel tank.

54 Claims, 11 Drawing Sheets

U.S. PATENT DOCUMENTS

| | | |
|---|---|---|
| 6,523,809 B2 | 2/2003 | Woody |
| 6,553,975 B2 | 4/2003 | Weldon et al. |
| 6,561,495 B2 * | 5/2003 | Woody ................. 261/37 |
| 6,601,569 B2 | 8/2003 | Weldon et al. |
| 6,615,792 B1 | 9/2003 | Grifka et al. |
| 6,640,770 B2 * | 11/2003 | Woody .............. 123/198 D |
| 6,668,807 B2 | 12/2003 | Weldon et al. |
| 6,691,683 B2 | 2/2004 | Gracyalny et al. |
| 6,986,340 B2 * | 1/2006 | Gracyalny et al. .......... 123/516 |
| RE38,991 E * | 2/2006 | Shaw et al. ............ 220/203.11 |
| 2003/0173365 A1 | 9/2003 | Stickel |

* cited by examiner

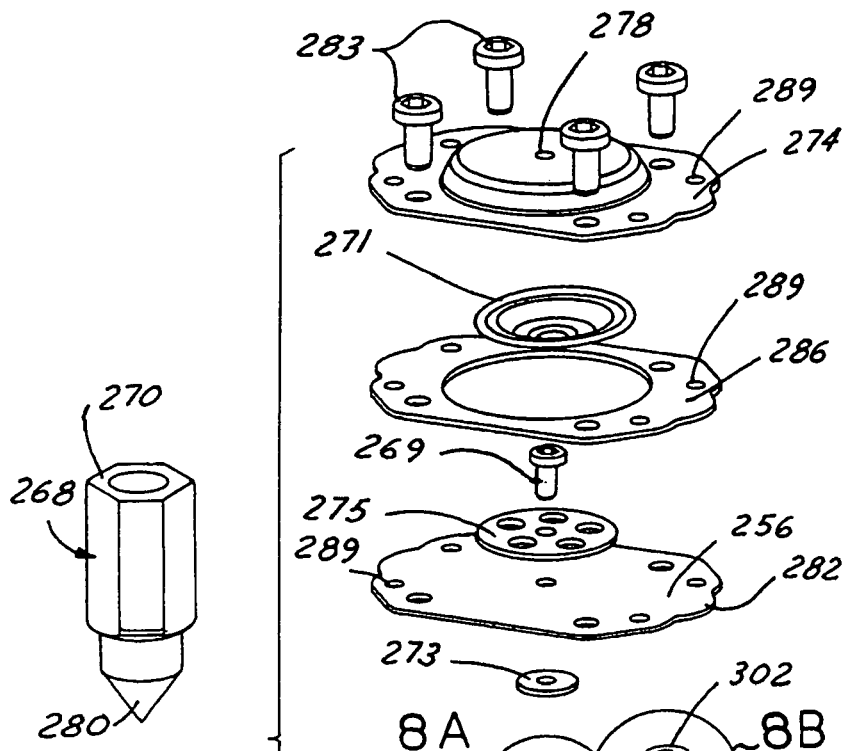
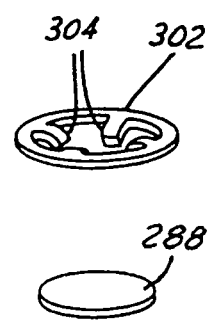
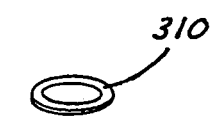
FIG. 8A
FIG. 8B
FIG. 8

EVAPORATIVE EMISSION CONTROLS IN A FUEL SYSTEM

CROSS-REFERENCES TO RELATED APPLICATIONS

The present invention is related to pending U.S. patent application of Ronald H. Roche et al, Ser. No. 10/955,795, filed Sep. 30, 2004, entitled "EVAPORATIVE EMISSION CONTROLS", and to pending U.S. patent application of Ronald H. Roche et al, Ser. No. 10/955,781, filed Sep. 30, 2004, entitled "CONTROLLING EVAPORATIVE EMISSIONS IN A FUEL SYSTEM". Each of the above-listed cross-referenced patent applications is assigned to the assignee hereof and is incorporated herein by reference.

FIELD OF THE INVENTION

This invention relates generally to volatile fuel storage and delivery systems for internal combustion engines, and more particularly to evaporative emission controls adapted for use with a carburetor.

BACKGROUND OF THE INVENTION

A fuel storage and delivery system typically includes a fuel tank and a carburetor that are adapted for use in small, internal combustion engine-powered apparatuses. These apparatuses comprise a large consumer market of popular lawn and garden products, which include hand-held equipment such as hedge trimmers, grass trimmers, and chainsaws and further include ground-supported equipment such as garden tractors, rototillers, and lawnmowers. In recent years, such products have been improved to reduce engine exhaust emissions, but now emphasis is being placed on improving these products to reduce non-exhaust emissions of volatile fuels such as gasoline.

Volatile fuel emissions generally include hot soak losses, running losses, and diurnal losses. Diurnal losses result from emission of liquid or vaporous fuel and include permeation losses and evaporative losses. Permeation losses occur when fuel vapor permeates through gaskets, fuel lines, or the fuel tank, and such losses are often abated by materials-oriented solutions such as integrating vapor barrier layers within fuel lines and fuel tanks. Evaporative losses occur when liquid fuel evaporates into hydrocarbon vapor and escapes into the atmosphere. Evaporation of liquid fuel into fuel vapor is usually due to volatility of the fuel, vibration of the fuel tank and sloshing of the fuel therein, and temperature fluctuations of the fuel. Evaporative losses most often occur 1) when fuel vapors in a fuel tank are vented to the atmosphere, and 2) when fuel vapors in a carburetor are vented or otherwise escape to the atmosphere.

Fuel vapors are often vented from a fuel tank to the atmosphere to avoid build-up of positive pressure in the fuel tank. Hand-held equipment use diaphragm carburetors, which have spring-biased inlet valves that provide automatic shutoff against such positive tank pressures and, thus, do not require outward venting of the fuel tank. But ground-supported equipment use float-bowl carburetors, which become flooded under such positive tank pressures. When an engine of a piece of ground-supported equipment is operating, fuel flows out of the fuel tank, and the tank vent allows make-up air to enter the tank to replace the fuel and thereby prevent a negative pressure condition therein. When the engine is not operating, however, fuel vapors may be permitted to vent out to the atmosphere from within the fuel tank to limit tank pressure and avoid carburetor flooding.

Fuel tank vapors are typically recovered using a fuel vapor recovery system. Such systems may include a carbon canister having activated charcoal therein that receives fuel vapors through a valve assembly mounted on the fuel tank and that communicates with an intake manifold of the engine. During engine operation, negative pressure in the intake manifold draws fuel vapor out of the carbon canister. The valve assembly usually has a valve that is responsive to the level of liquid fuel in the fuel tank that enables the valve to stay open at a sufficiently low liquid level to permit fuel vapors to flow freely from the tank into the carbon canister. When filling the tank, as the liquid fuel level rises to approach a desired maximum level of fuel, a float is raised to close the valve to prevent liquid fuel from flowing through the valve and into the vapor-receiving canister. While such a system works well, the added cost of the carbon canister and float valve is prohibitive in many applications.

In addition to fuel tank vapor emissions, fuel vapors also tend to escape from a carburetor, particularly when the associated equipment is hot and/or stored for an extended period of time. To illustrate, when a piece of engine-powered equipment is shut down after running at normal operating temperatures, heat continues to transfer from a hot cylinder head of the engine through an intake manifold to the carburetor. Moreover, the equipment may be placed in a storage enclosure with limited or no ventilation, wherein the temperature may fluctuate over a twenty-four hour period from a daytime high exceeding 160 degrees Fahrenheit to a nighttime low of 60 degrees Fahrenheit. Gasoline fuel readily evaporates over a wide temperature range starting at around 90 degrees Fahrenheit, with approximately thirty percent by volume evaporating over a temperature increase to 160 degrees Fahrenheit over a 24 hour period, and with about ninety plus percent by volume evaporating over an increase to 350 degrees Fahrenheit over a 24 hour period. In any case, the temperature of the liquid fuel within the carburetor increases dramatically, thereby vaporizing some of the liquid fuel into fuel vapor.

Fuel escapes from some carburetors more readily than others. Hand-held equipment typically includes two-stroke engines having diaphragm carburetors, which tend to yield relatively low evaporative emissions. Unfortunately, however, diaphragm carburetors are not practical for all engine applications because they tend to have limited fuel metering capabilities, thereby leading to operational instability with certain types of engines. Precision fuel metering is generally not required in engines equipped with diaphragm carburetors, because such engines are usually operated in only two fixed throttle settings—idle or wide-open-throttle (WOT)—such as in chainsaw or grass trimmer applications. In contrast, ground-supported equipment typically have engines with float-bowl carburetors that usually have relatively higher fuel metering capabilities to accommodate infinitely variable throttle settings between idle and WOT, but tend to yield relatively higher evaporative emissions for several reasons.

First, the volume of fuel contained in a float bowl of a given float bowl carburetor is usually several times greater than that contained in a chamber of a diaphragm carburetor. Commensurately, the total volume of liquid fuel that may be depleted from a float bowl carburetor will be several times greater than that from a diaphragm carburetor.

Second, diaphragm carburetors are not continuously supplied with fuel from the fuel tank when the engine is not operating. In this case, fuel may completely evaporate from within the diaphragm carburetor, but is not continuously replenished with fuel from the fuel tank. This is because a typical diaphragm carburetor has an inlet needle valve that is strongly biased closed to prevent entry of such fuel. The typical float bowl carburetor, however, is continuously supplied with additional liquid fuel from which additional evaporation takes place. This is because a typical float-bowl carburetor has an inlet needle valve that is normally biased open unless the float bowl is filled with fuel to a predetermined level, at which point a float gently raises the inlet needle valve to a closed position. As the liquid fuel vaporizes and escapes from the carburetor float bowl, the float and inlet needle valve drop thereby allowing fresh liquid fuel to enter the float bowl through the float-actuated inlet needle valve under gravity feed from the fuel tank. Hence, diurnal losses in a float bowl carburetor are increased due to these vaporization-replenishment-vaporization cycles.

Third, as indicated above, float-bowl carburetors are more sensitive to fuel inlet pressure than diaphragm carburetors. Consequently, the fuel tank must have as low and constant an internal pressure as possible, yet still support a high enough threshold pressure to minimize fuel vapor loss to the atmosphere. Unfortunately, conventional combination rubber duck bill and umbrella valves, typically associated with diaphragm carburetor fuel systems, tend to suffer from hysteresis. Thus, such valves are not capable of repeatably holding a tank pressure close enough to a predetermined threshold pressure.

In conclusion, equipment manufacturers are in need of a wide range of reliable and comprehensive technological solutions to the problem of diurnal evaporative emissions of volatile fuel from a fuel system—particularly those solutions that address all of the escape routes of vapor emissions and that are robust and affordable to consumers.

SUMMARY OF THE INVENTION

A method and a fuel system for delivering liquid fuel from a fuel tank to a float bowl carburetor of an internal combustion engine, wherein evaporative emissions from at least one of the fuel tank and float bowl carburetor are mitigated. Liquid fuel and fuel vapors are usually present within the fuel tank. During operation of the internal combustion engine, fluid communication of the liquid fuel is permitted between the fuel tank and the float bowl carburetor, and outward venting of the fuel vapors is permitted from the fuel tank when internal pressure of the fuel tank exceeds a predetermined threshold value. When the engine is not operating, fluid communication of the liquid fuel is prevented between the fuel tank and the float bowl carburetor, and outward venting of the fuel vapors is permitted from the fuel tank when internal pressure of the fuel tank exceeds the predetermined threshold value.

According to another aspect of the present invention, a pressure controlled fuel tank assembly is preferably utilized with a float-bowl carburetor and has a pressure valve assembly preferably integrated into a fuel filler cap of the tank which relieves both vacuum pressure and super-atmospheric pressure above a threshold value. Positive pressure is released by a diaphragm-type pressure relief valve and any vacuum pressure is relieved by preferably a poppet-type valve. The diaphragm valve is biased closed by a spring disposed in a reference chamber between a top side of the diaphragm and a cover engaged to the cap. A pressure chamber is defined between a bottom side of the diaphragm and the cap and communicates with a fuel storage cavity of the tank via at least one orifice extending through the cap. The pressure relief valve preferably has a needle type valve head engaged at one end to the bottom side of the diaphragm and a conical tipped opposite end which releasably seals to a valve seat carried by the cap when the pressure relief valve is closed due to the pressure in the tank being less than the threshold value. Preferably, a vacuum channel communicates the pressure chamber with the atmosphere for free-flowing fresh air into the tank when the interposing poppet valve is open.

According to another aspect of the present invention a fuel vapor control system of a combustion engine utilizes a pneumatic fuel shut-off valve for isolating a fuel tank from a carburetor during shut down of a combustion engine, and a two-way vent valve for controllably venting the fuel tank. The shut-off valve is normally biased closed and automatically opens upon a pressure signal preferably sensed from the engine during starting and running, and without being influenced by tank pressure. A housing of the shut-off valve in part defines inlet and outlet chambers, separated by a dynamic chamber and cooperating inlet and outlet diaphragms. The inlet and outlet chambers are in continuous communication with one another and the fuel tank, via a conduit through which preferably flows liquid fuel. Spaced between the inlet and outlet diaphragms is a third diaphragm which sealably separates the dynamic chamber into a pair of pressure sub-chambers. Preferably, one sub-chamber acts as a reference chamber and the second sub-chamber acts as a pressure chamber sensing pressure changes indicative of a running and/or shutdown engine. All three diaphragms move in unison via a mechanical linkage engaged to a valve head. Pressure changes in the pressure chamber cause all three diaphragms to move in unison with the linkage and head, opening and/or closing the shut-off valve while the total volume of the inlet and outlet chambers remains substantially constant.

At least some of the objects, features and advantages that may be achieved by at least certain embodiments of the invention include providing a method, fuel system, and components that enable a reduction in the emission of unburned fuel vapors into the atmosphere, improve control of fluid flow in a fuel system, are readily adaptable to a wide range of applications, are of relatively simple design and economical manufacture and assembly, are durable, reliable and have a long, useful life in service.

Of course, other objects, features and advantages will be apparent in view of this disclosure to those skilled in the art. Other methods, fuel systems, and components embodying the invention may achieve more or less than the noted objects, features or advantages.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 8 is an exploded perspective view of the filler cap of FIG. 4;

FIG. 8A is an enlarged perspective view of a valve head of a pressure relief valve of the pressure valve assembly and taken from FIG. 8;

FIG. 8B is an enlarged perspective view of a retaining clip and a valve head of a vacuum relief valve of the pressure valve assembly and taken from FIG. 8;

DETAILED DESCRIPTION OF THE PREFERRED EMBODIMENTS

The fuel system of the present invention mitigates the quantity of fuel vapor losses to the atmosphere, and does not necessarily require use of a carbon canister to do so. In developing the present invention, it was discovered that one way to mitigate fuel vapor losses from a fuel tank is to change the conventional fuel tank venting scheme from free bi-directional venting to restricted bi-directional venting. Such restricted bi-directional venting prevents the fuel tank from venting out to the atmosphere until a predetermined threshold of internal tank superatmospheric pressure is reached, yet permits free venting of the atmosphere into the fuel tank to preclude any negative pressure conditions within the fuel tank. It was also discovered that fuel vapor losses may also be mitigated by providing a positive shutoff of fuel supply to a float bowl carburetor when the engine is not operating.

Figure 1:
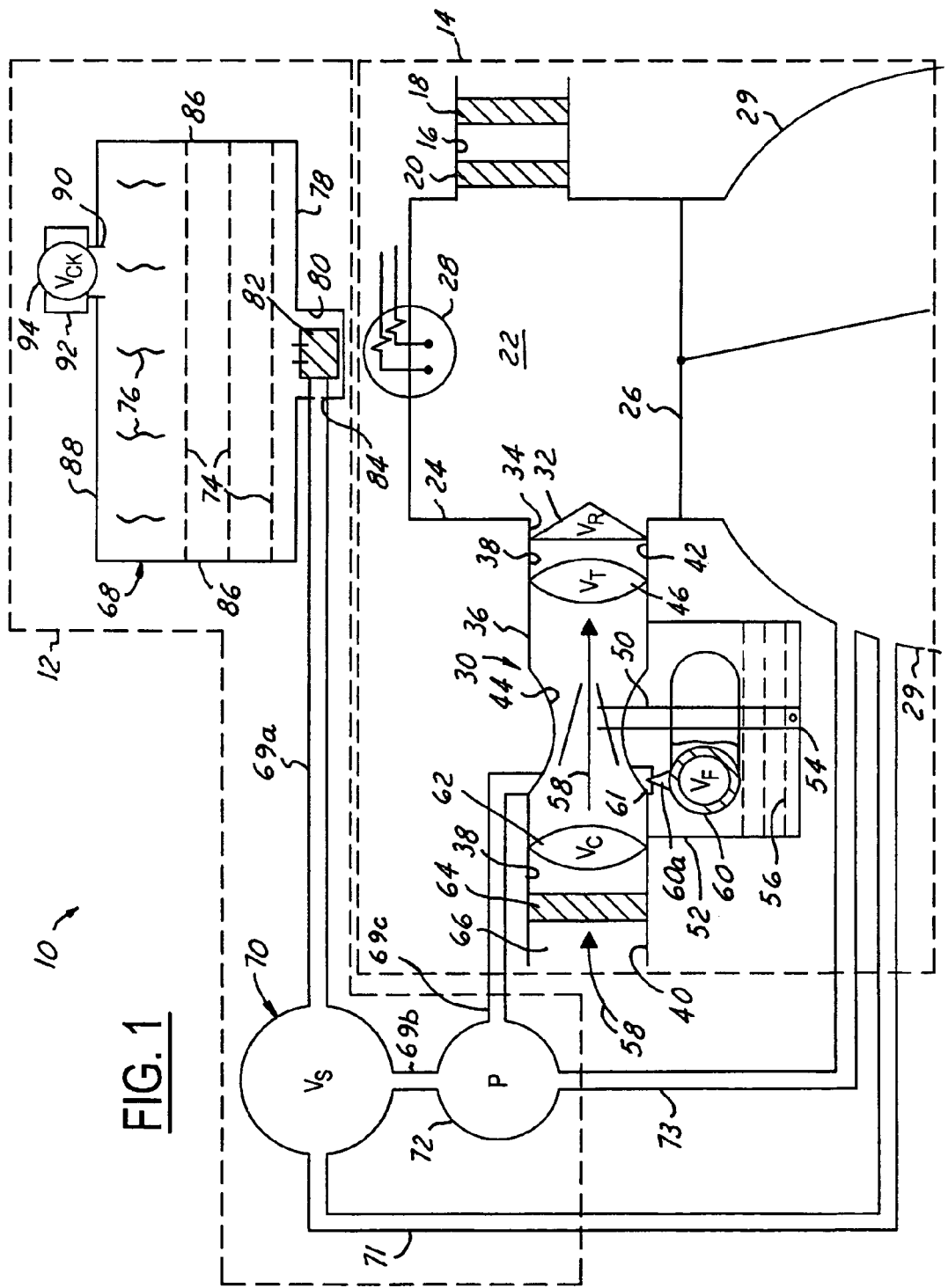
FIG. 1 is a diagrammatic view of an engine-powered apparatus having a fuel system according to one presently preferred embodiment of the present invention.

Referring now in detail to the drawing figures, FIG. 1 illustrates a diagrammatic view of a portion of a ground-supported engine-powered apparatus 10 such as a garden tractor, rototiller, pressure washer, generator, lawnmower, or the like. More specifically, FIG. 1 depicts a fuel system 12 for storing fuel and delivering fuel to an internal combustion engine 14 for combustion therein.

The internal combustion engine 14 may be a conventional two-stroke or four-stroke engine with the exception of the particular details described herein. Starting at a downstream end, the engine 14 includes an exhaust passage 16 preferably having a muffler 18 and perhaps a catalyst element 20 disposed therein, as is typically known in the art. The exhaust passage 16 exhausts gases from a combustion chamber 22 that is defined by a cylinder 24 and a piston 26. The exhaust gases are produced by a combustion process initiated by a spark plug 28 and fueled by an air/fuel mixture supplied by a carburetor 30 through a reed valve or check valve 32 disposed in an inlet passage 34 of the engine 14. As is the usual case, a crankcase 29 is connected to the cylinder 24.

The carburetor 30 is preferably a low evaporative emission float-bowl carburetor that is exemplified by U.S. Pat. No. 6,561,495 or by U.S. Pat. No. 6,640,770, both of which are assigned to the assignee hereof and incorporated by reference in their entireties herein. The carburetor 30 includes a body 36 with an air/fuel mixing passage 38 extending therethrough from an inlet end 40 to an outlet end 42 in communication with the inlet passage 34 of the engine 14 and having a venturi 44 therebetween. At the outlet end 42, a butterfly-style throttle valve 46 is disposed within the passage 38 for regulating the quantity of mixed fuel and air that proceeds downstream to the combustion chamber 22 of the engine 14. Upstream of the throttle valve 46, the venturi 44 of the passage 38 is in fluid communication with a main nozzle 50 depending from the body 36 of the carburetor 30 and terminating inside of a float bowl 52, which is mounted against the body 36 of the carburetor 30 and preferably to an inlet end 54 of the main nozzle 50.

The float bowl 52 contains a substantially constant supply of carburetor fuel 56, which, under a pressure drop produced by fluid flow through the venturi 44 in the mixing passage 38 caused by engine manifold vacuum pulled therethrough, flows upward through the main nozzle 50 and into the venturi 44 to be mixed with incoming air 58. A float valve 60 is typically disposed within the float bowl 52, surrounding the main nozzle 50, for regulating the quantity of incoming liquid fuel based on a predetermined level of the fuel 56 in the float bowl 52. The float valve 60 includes an inlet needle valve 60a and an inlet valve seat 61, which is reduced in diameter compared to typical seat diameters used for conventional gravity head fuel systems. The reduction in diameter should ensure that the fuel tank threshold pressure of the incoming fuel acting on the inlet needle valve 60a will not overwhelm the upward force of the float valve 60 and thereby flood the carburetor float bowl 52.

Just upstream of the venturi 44, there is disposed a butterfly-style choke valve 62 for regulating the quantity of air that proceeds downstream through the venturi 44, typically for cold starting and warm-up of the engine. Further upstream, there is disposed an air filter 64 for filtering incoming air 58 to prevent dirt and other contaminants from entering the rest of the engine 14. A noise suppression chamber 66 is defined between the air filter 64 and the opening of the inlet end 40 of the carburetor passage 38.

The fuel system 12 generally includes a fuel tank 68 for containing fuel, a pressure-actuated fuel shutoff valve 70 for controlling flow of fuel from the fuel tank 68 to the engine 14, and a first liquid conduit or fuel line 69a that communicates the fuel tank 68 with a fuel inlet of the fuel shutoff valve 70. As used herein, the term conduit includes individual hoses, pipes, lines or the like, and also includes integral passages, bores, and the like. The fuel system 12 also includes a pressure-actuated pump 72 for pumping fuel from the fuel shutoff valve 70 to the engine 14. The present invention contemplates that pump 72 need not be pneumatically actuated, but could also be actuated electrically, mechanically, and the like. Moreover, the pump 72 may not be required in cases where there is sufficient gravity head from the fuel tank 68 to supply fuel. The fuel system 12 further includes a second liquid conduit or fuel line 69b which communicates a fuel outlet of the valve 70 with a fuel inlet of the pump 72, and a third liquid conduit or fuel line 69c which communicates a fuel outlet of the pump 72 with the valve 60a and valve seat 61 of the carburetor float bowl 52.

The fuel shutoff valve 70 is provided to shut off fuel supply to the engine when the engine is not operating. The fuel shutoff valve 70 is pressure actuated, such as by pressure pulses received through a pulse line 71 in fluid communication between a control port of the valve 70 and the crankcase 29 of the engine 14. Pressure fluctuations within the engine crankcase 29 generate pressure pulses that actuate the fuel shutoff valve 70 between open and closed positions, as described in greater detail below with general reference to FIGS. 11 through 17 and with particular reference to FIGS. 16 and 17.

The pump 72 is provided to compensate for the reduction in the size of the inlet valve seat 61. Without the pump 72, and with the reduced inlet valve seat diameter, there may not be adequate gravity head from the bottom of an unpressurized and near-empty fuel tank to the carburetor 30 in order to deliver sufficient fuel flow to the carburetor 30 to meet the demand of the operating engine. Accordingly, the pump 72 boosts fuel pressure to ensure a constant supply of fuel to the carburetor 30. The pump 72 is pressure actuated, such as by pressure pulses received through a pulse line 73 in fluid communication between a control port of the pump 72 and the crankcase 29 of the engine 14. Pressure fluctuations within the engine crankcase 29 generate pressure pulses that actuate the pump 72.

Figure 2:
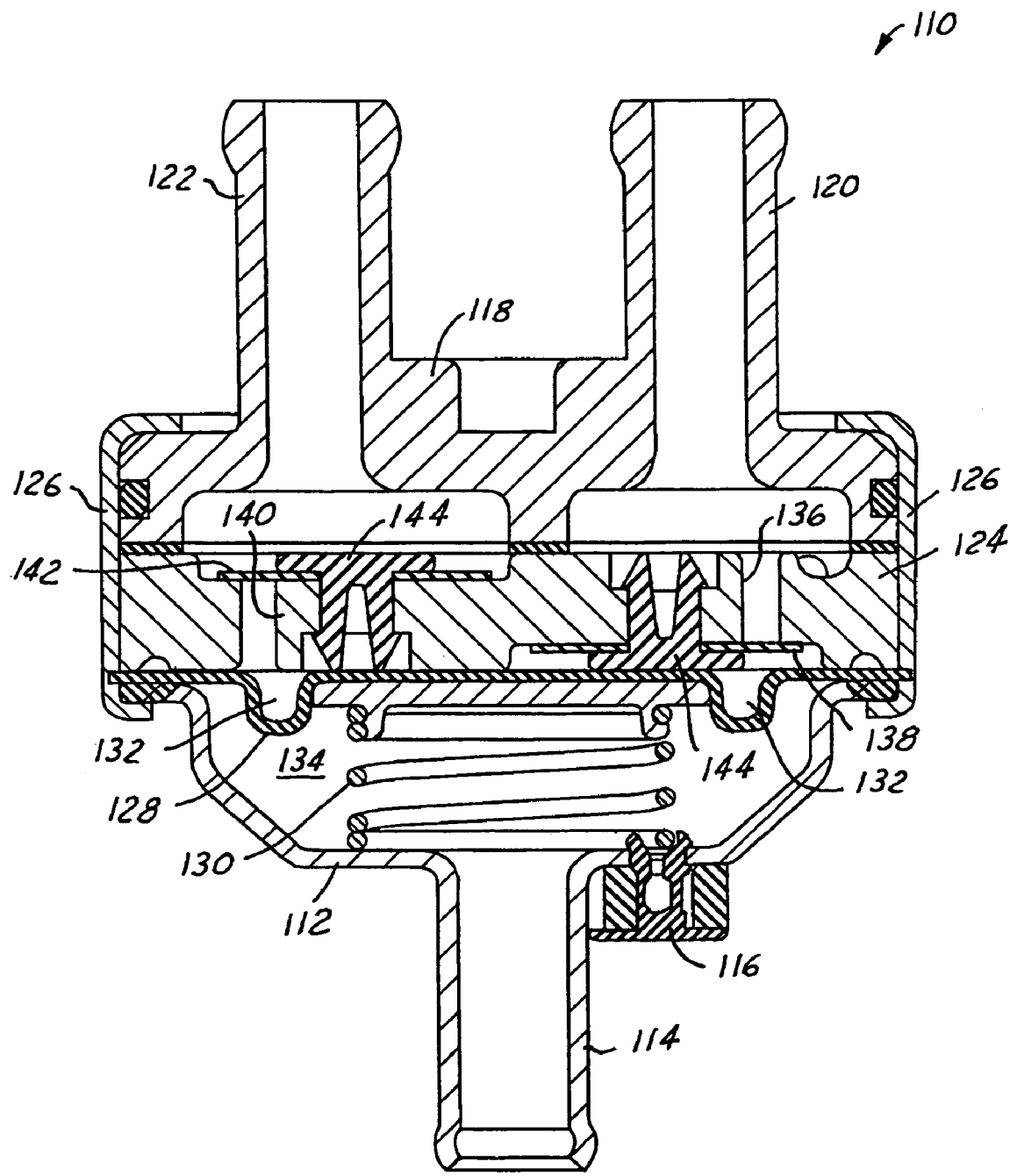
FIG. 2 is a cross-sectional view of a pulse-actuated fuel pump adapted for use with the fuel system of FIG. 1.

FIG. 2 illustrates one presently preferred embodiment of a fuel pump 110 that may be used with the fuel system embodiment of FIG. 1. The fuel pump 110 generally includes a vacuum body 112 with a vacuum nipple 114 and vent 116, a fuel body 118 with inlet and outlet nipples 120, 122, a valve body 124 disposed therebetween, and an annular retainer 126 for holding the bodies 112, 118, 124 together. A pump diaphragm 128 is disposed between the valve body 124 and the vacuum body 112 and is biased against the valve body 124 by a coiled compression spring 130. The diaphragm 128 partially defines a fuel chamber 132 on one side, and a crankcase pressure pulse chamber 134 on its other side that communicates with the engine crankcase (not shown) through the pulse line (not shown).

The pump 110 is pressure actuated by engine crankcase pressure fluctuations. A negative pressure pulse from the engine crankcase to the pressure pulse chamber 134 displaces the diaphragm 128 against the bias force of the spring 130 and in a direction tending to increase the volume of the fuel chamber 132 to draw fuel from the inlet nipple 120, and through an inlet passage 136 and past a fuel inlet valve 138 in the valve body 124. The fuel inlet valve 138 is a flap type valve that is opened by the decreased pressure within the fuel chamber 132 to permit fuel flow therethrough and into the fuel chamber 132. A subsequent absence of negative pressure or a presence of a positive pressure pulse from the engine crankcase to the pressure pulse chamber 134 allows the spring 130 to displace the diaphragm 128 in the opposite direction tending to decrease the volume of the fuel chamber 132 to thereby increase the pressure of the fuel therein and to discharge it through an outlet passage 140 and past an outlet valve 142 in the valve body 124 and out the outlet nipple 122 of the fuel body 118. The outlet valve 142 is also preferably a flap type valve and is opened by the increase in pressure in the fuel chamber 132. Barbed retainers 144 hold the flap valves 138, 142 in place on the valve body 124 as shown.

Referring again to FIG. 1, the fuel tank 68 contains the fuel, which includes a portion of liquid fuel 74 and a portion of fuel vapors 76. The liquid fuel 74 is substantially composed of a combustible liquid but may include some impurities as is typical with fuel. Similarly, the fuel vapors 76 are substantially composed of combustible fuel vapors but may also be mixed with impurities or may be diluted with a supply of atmospheric or fresh air. The fuel tank 68 includes a bottom wall 78 with a liquid reservoir 80 therein for housing a fuel filter 82 in fluid communication with a liquid fuel outlet 84 through the reservoir 80. The fuel filter 82 may be any one of a multitude of conventional fuel tank filters, which are well known in the art. The fuel tank 68 further includes a sidewall 86 extending from the bottom wall 78, and a top or encapsulating wall 88 terminating the sidewall 86. The walls 78, 86, 88 all define a fuel tank interior or storage cavity. A fuel inlet, nozzle, or filler spout 90 is provided in the top wall 88, preferably disposed at a high point of the fuel tank 68, and is sealed by a vented fuel cap or vented closure 92. The spout 90 is also a potential outlet for the fuel vapors 76. The fuel tank 68 may be constructed from injection or blow molding plastic, thermo-forming plastic, stamping and welding metal, or the like.

The vented closure 92 is adapted to permit free venting into the fuel tank 68 and restricted venting out of the fuel tank 68. For example, the vented closure 92 may include a vapor vent valve or check valves 94 therein to accomplish this function as discussed further herein below with particular reference to FIGS. 3 through 10. As used herein, vapor vent valve may encompass check valves, and the like. As defined herein, the term vent broadly includes any outward discharging, exhausting, or expelling of fluid, or any inward admission, induction, or receiving of fluid.

The tank 68 and closure 92 may be composed of any suitable materials including a multi-layer composition having a vapor barrier layer. As one example without limitation, the tank 68 and closure 92 may be composed of an ethylene vinyl alcohol barrier layer that is sandwiched between high density polyethylene structural layers. Similarly, the fuel lines 69a, 69b, 69c may be composed of multiple layers and by way of example, may be three layer non-conductive fuel lines such as Permblok® 330 hoses or the like that are available from the assignee hereof.

Referring to FIGS. 3–6, a pressure controlled fuel tank assembly 220 tightly controls (i.e. low hysteresis) internal super-atmospheric fuel pressure at a predetermined threshold value established in-part by competing pressure restraints of a float-type carburetor 221 and by fuel vapor release restraints established by government regulations. The assembly 220 has a fuel tank 222 that is relatively impermeable to fuel vapor with an encapsulating wall or shell 224 that defines a fuel storage cavity 226, and an externally protruding fuel fill spout 228. A removable fuel fill cap 230 of the tank 222 preferably secures to the fuel fill spout 228 by female threads 232 which thread to male threads 234 carried by the spout 228, and seals around the top of the spout on an underside 236 of the cap 230.

A pressure valve assembly 238, preferably integrated into the cap 230, has a combined pressure relief valve 244 for relieving the tank 222 of super-atmospheric pressure above a pre-established threshold value, and a vacuum relief valve 246 (FIGS. 5 and 6) for freely relieving the tank 222 of sub-atmospheric pressure. During dynamic periods of, for example, increasing temperature, pressure within the tank cavity 226 will increase until a predetermined super-atmospheric threshold value is reached (e.g. approximately four psig or preferably anywhere between 0 and 10 psig), wherein the pressure relief valve 244 intermittently opens to closely hold tank pressure at the threshold value and controllably release fuel vapor to the atmosphere. Periods of increasing fuel and/or tank temperature can be caused by residual heat emitted from a hot engine, or caused by the tank being exposed to the sun during a hot day. The resulting increase in tank pressure is particularly prevalent when the engine is not running and is not drawing fuel out of the fuel tank which would tend to decrease tank pressure.

Figure 3:
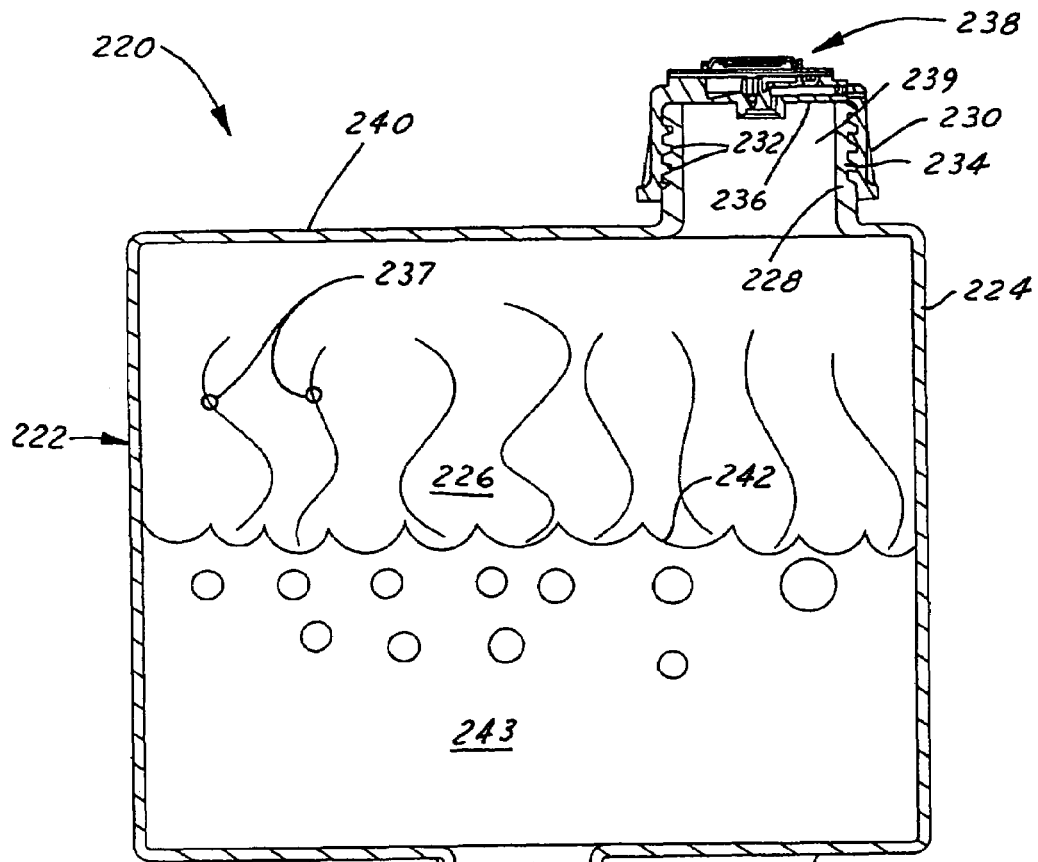
FIG. 3 is a cross-sectional view of a pressure controlled fuel tank assembly according to an alternative embodiment of the present invention.
Figure 4:
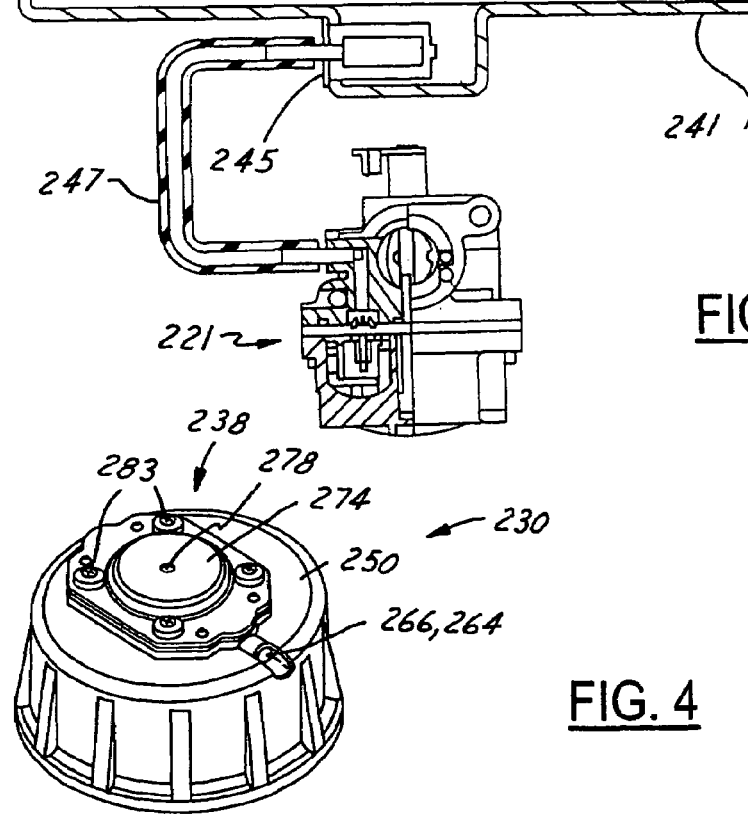
FIG. 4 is a perspective view of a fuel tank filler cap having a pressure valve assembly, for use with the embodiments of FIGS. 1 and 3.

To prevent liquid fuel seepage or leakage out of the tank 222, the spout 228 and associated cap 230 are preferably located above a fuel surface 242 of liquid fuel 243. The spout 228 projects from an upper or top portion 240 of the tank 222 which generally defines a vapor dome portion 239 of the tank cavity 226, as illustrated in FIG. 3. A bottom portion 241 of the tank 222 is generally in direct contact with and confines the fuel 243 and preferably carries only one penetration 245 for a fuel feed line 247 which flows liquid fuel 243 preferably via gravity to the carburetor 221.

With the valve assembly 238 integrated into the cap 230, the assembly is conveniently spaced above the liquid fuel to vent air and prevent liquid saturation and seepage of fuel through the valve assembly. Moreover, integrating the valve assembly 238 into the cap 230 minimizes tank penetrations which simplifies manufacturing, reduces cost, reduces potential fuel vapor leak paths.

The diaphragm-type pressure relief valve 244 (see e.g. FIGS. 5 and 6) of the valve assembly 238 has a resilient diaphragm 256 trapped about its peripheral edge 282 by a cover 274, gasket 286, and a body portion 250 which in the preferred instance is the cap 230. Both the cover 274 and the body portion 250 together define a valve assembly housing. The cover 274, gasket 286, and a first or top side 272 of the diaphragm 256 generally define a reference chamber 276 preferably vented to atmosphere via port 278. The opposite or bottom side 254 of the diaphragm 256 and the body portion 250 generally define a pressure chamber 252 being in continuous communication with the vapor dome 239 via a series of orifices 248 which penetrate the body portion 250.

A valve needle or head 268 of the pressure relief valve 244 is seated against an annular valve seat 262 carried by the body portion 250 when the valve 244 is closed. The pressure relief valve 244 is biased closed by a compression spring 271 disposed in the reference chamber 276 and compressed between the cover 274 and the diaphragm 256. When pressure in the tank 222 and thus the pressure chamber 252 exceeds the super-atmospheric threshold value, the valve 244 opens, moving the diaphragm 256 upward and carrying the valve head 268 with it away from the valve seat 262. Once open, fuel vapor controllably flows from the pressure chamber 252 and through a vent or relief passage 264 to atmosphere.

Referring to FIGS. 5–9, the fuel vapor 237 and air contained in the vapor dome 239 is continuously exposed to the pressure chamber 252 via at least one orifice 248 defined by the body portion 250. From the pressure chamber 252, fuel vapor is exposed continuously to a substantially cylindrical void or counter bore 258 opened in an axially upward direction and defined by an upward extending collar 260 of the body portion 250 disposed generally in the pressure chamber 252. The annular valve seat 262 of the relief valve 244 generally defines the bottom of the cylindrical void 258. When the relief valve 244 is open, fuel vapor and air flows downward from the void 258 and into the communicating fuel vapor pressure relief or vent passage 264, wherein the fuel vapor 237 and air vents directly to atmosphere through an outlet port 266 carried by the cap 230.

The head or needle 280 of the pressure relief valve 268 moves vertically with the diaphragm 256 and is secured at a top end 270 to the bottom side 254 of the diaphragm 256 preferably by a rivet or fastener 269 which penetrates the center of the diaphragm 256 and inserts axially into the needle 268 with reinforcing washers 273, 275 disposed on each side 254, 272. During operation, as pressure increases within the pressure chamber 252, the diaphragm 256 flexes upward into the reference chamber 276 and against the resilient force of the spring 271, carrying the needle 268 with it. This causes the needle 268 to lift vertically off the seat 262 as it is guided by the collar 260 of the body portion 250. Once open, the fuel vapor is free to flow from the cylindrical void 258 and ultimately from the vapor dome 239 and into the passage 264 where it is free to vent to atmosphere.

The diaphragm 256 preferably does not act directly upon the compression spring 271, and instead is protected from spring abrasion by the reinforcing washer 275. The relative large diameter of the plate 275 will distribute the pressure load on the diaphragm 256 against the compression spring 271. The spring 271 is sized to achieve the desired pressure threshold value of the pressure valve assembly 238. The relief valve 244 will remain open provided the upward force generally exceeds the downward force of the spring 271. The upward force is calculated generally as the product of the pressure in the pressure chamber 252 times the exposed area of the bottom side 254. When the pressure in the pressure chamber 252 declines below the threshold value, the downward force of the spring 271 exceeds the upward force causing the diaphragm 256 to return resiliently to a substantially un-flexed state carrying the needle 268 downward until a resilient rubber conical tip 280 of the needle 268 (as best shown in FIG. 8A) seals to the annular seat 262 thus closing the relief valve 244. With valve 244 closed, any release of unregulated fuel vapor to atmosphere is prevented.

The opening and closing of the relief valve 244 will repeat with changing temperature or dynamic conditions imposed upon the fuel tank assembly 220 which effect tank pressure, thus holding the pressure to the pre-determined threshold value with considerably less hysteresis than a conventional rubber umbrella or duck bill valve or any other type of conventional valve where the pressure acts directly upon a valve head. The present relief valve 244 maintains minimal hysteresis because the pressure regulation is controlled by the pressure differential across the diaphragm 256 which has a much larger acting area than the valve seat 262. In-other-words, the valve head 268 acts as a slave to the sensing mechanism or diaphragm 256 and is not the actual sensing mechanism as found in convention pressure relief valves. Moreover, since actual vertical movement of the diaphragm 256 and needle 268 can be very small and still vent sufficiently (preferably in the range of 0.001 to 0.010 inches), the diaphragm 256 can be flat and does not require a convolution, thus simplifying manufacturing and reducing cost.

Figure 5:
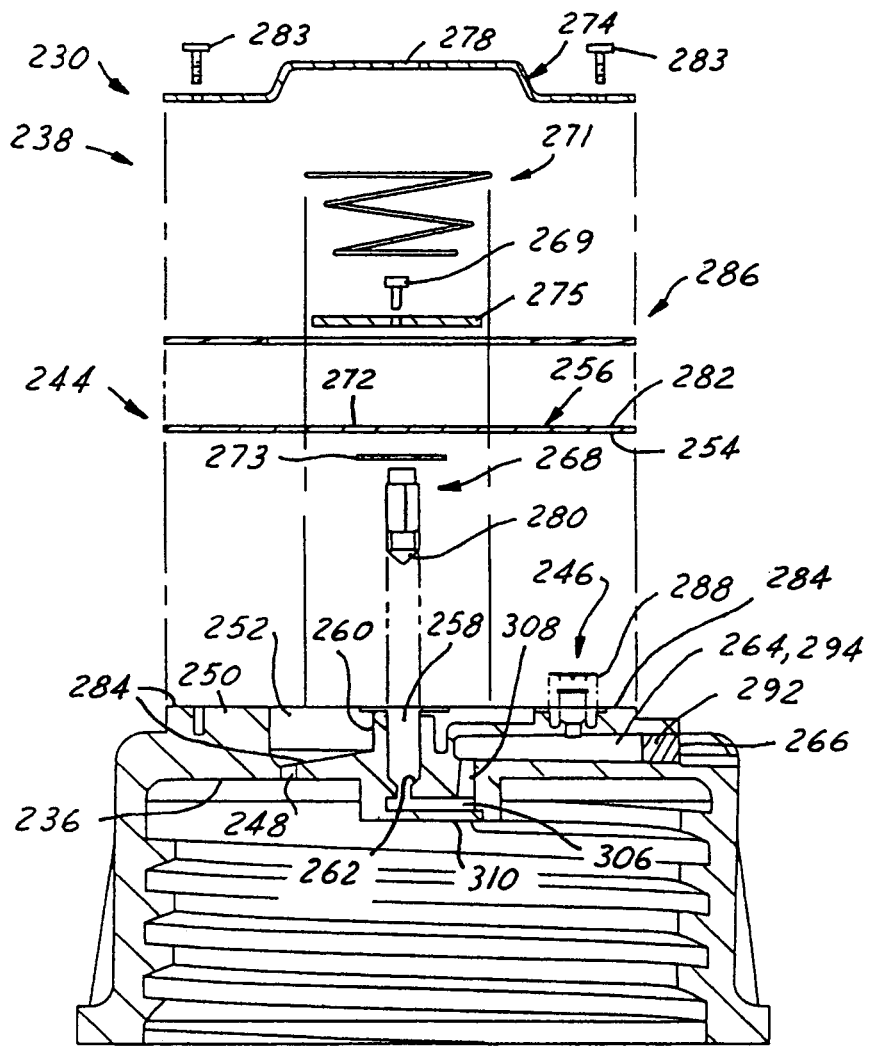
FIG. 5 is an exploded cross-sectional view of the filler cap of FIG. 4.
Figure 6:
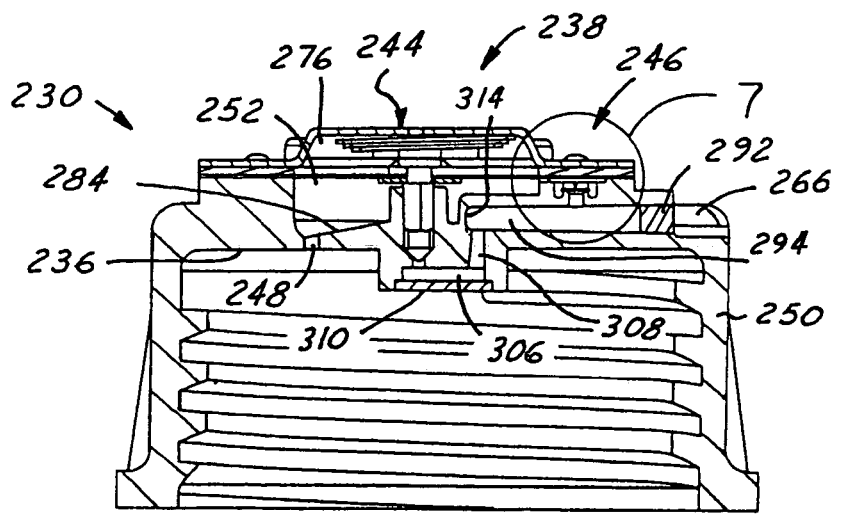
FIG. 6 is a cross-sectional view of the filler cap of FIG. 4.
Figure 7:
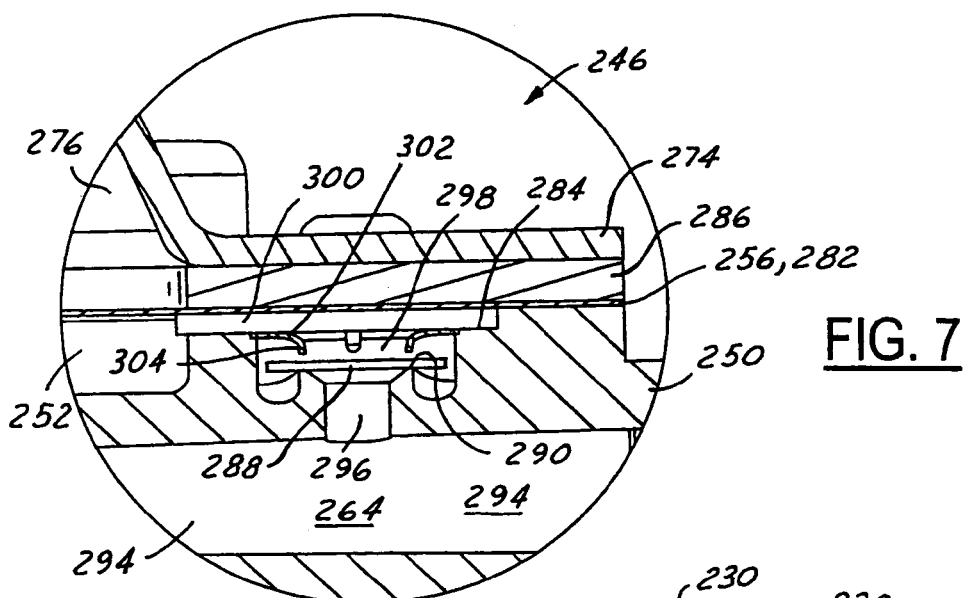
FIG. 7 is an enlarged cross-sectional view of a vacuum relief valve taken from FIG. 4.
Figure 9:
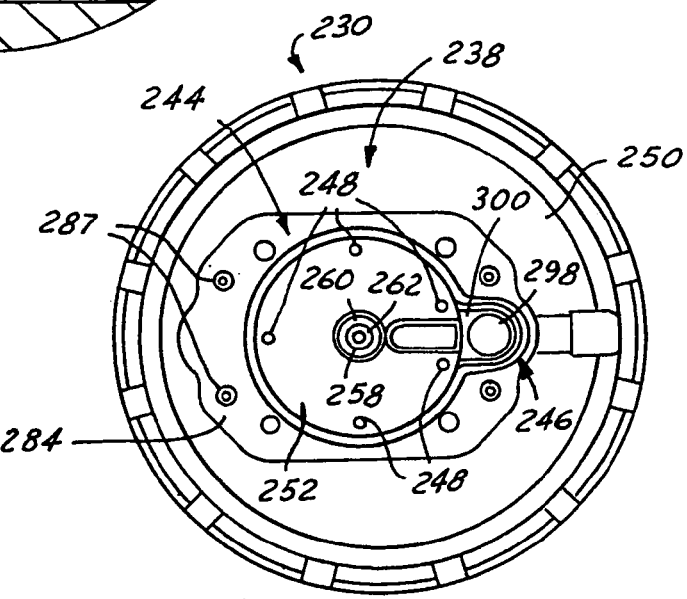
FIG. 9 is a top view of the filler cap with a cover and a diaphragm removed to show internal detail.

Referring to FIGS. 5–8, as previously described, the pressure relief valve 244 relieves super-atmospheric pressure from the tank 222, which can accumulate particularly when the engine is not running. However, when the engine is running the pressure relief valve 244 is typically closed and fuel is being removed from the tank. This fuel removal could create a vacuum in the vapor dome 239. To avoid generation of a significant vacuum, the vacuum relief valve 246 intermittently opens to relieve the vacuum pressure within the otherwise sealed tank 222 which could otherwise hinder or prevent gravity induced fuel flow to the carburetor 221, as best shown in FIG. 3. Like the pressure relief valve 244, the vacuum relief valve 246 preferably is also integrated into the body portion 250 and has a valve head 288 which lifts from an upward facing annular valve seat 290 carried by the body portion 250 to open and expose the vapor dome portion 239 of the tank cavity 226 to atmosphere via the shared pressure chamber 252, as best shown in FIG. 7. Unlike the pressure relief valve 244, the vacuum relief valve 246 is preferably not biased closed by a spring and instead closes generally via the weight of the poppet-like valve head 288 itself.

When the vacuum relief valve 246 is open, entrained particulate is removed from the incoming air by a porous filter element 292 press fitted into the outlet port 266 of a substantially horizontal outer leg 294 of the vent passage 264, as best shown in FIGS. 5 and 8. The incoming air flow is then diverted upward through a substantially vertical inlet channel 296 disposed concentrically and extending to the annular valve seat 290, as best shown in FIG. 7. The inlet channel 296 communicates with a vacuum sub-chamber 298 of the vacuum relief valve 246 when the valve is open. Incoming air then flows from the sub-chamber 298 and through an outlet channel 300 which communicates directly with the pressure chamber 252, wherein the incoming air is free to flow into the tank cavity 226 via the orifices 248. When the vacuum pressure is near atmospheric, the valve head 288 of the vacuum relief valve 246 will fall by its own weight and seal against the valve seat 290. Any subsequent super-atmospheric pressure increases within the cavity 226 will further assure that the vacuum relief valve 246 remains closed and sealed because the vacuum sub-chamber 298 is exposed to the same super-atmospheric pressure as the shared pressure chamber 252. A super-atmospheric pressure condition thus exerts an additional downward force against the valve head 288 which is directly proportional to the exposed portion of the valve head 288 located directly over the valve seat 290 within the sub-chamber 298.

The valve head 288 of the vacuum relief valve 246 is preferably a disc orientated substantially horizontally in the sub-chamber 298. The disc 288 is retained within the sub-chamber 298 by a generally annular retaining clip 302 disposed and spaced above the disc. During assembly, the retaining clip 302 press fits into a slight indentation defined by a general exterior surface 284 of the body portion 250 near the top of the sub-chamber 298 and below the outlet channel 300 which is defined by the exterior surface 284 and the bottom side 254 of the diaphragm 256 at a stationary portion of the peripheral edge 282. To limit upward movement and prevent skewing of the head or disc 288 within the sub-chamber 298, the retaining clip 302 has a plurality of circumferentially spaced tabs 304 which project downward into the sub-chamber 298 to intermittently contact the vertically fluctuating disc 288 when the vacuum relief valve 246 is generally open.

For ease of manufacturing and assembly, reduced cost, and improved packaging, the exterior surface 284 of the body portion 250 defines in-part the lower segments of the pressure chamber 252, the inlet channel 300 and the sub-chamber 298, and the bottom side 254 of the diaphragm 256 defines the upper segments. Similarly, the underside 236 of the body portion 250 defines in-part a substantially horizontal inner leg 306 of the vent passage 264 which communicates between the cylindrical void 258 at the valve seat 262 and a substantially vertical mid-leg 308 of the passage that communicates with an end of the outer leg 294 disposed above. A plug 310 is sealably secured into a depression formed by the underside 236 and thus defines the lower section of the inner leg 306. The plug 310 may be press fit, glued, welded, or the like.

The orifices 248 extend directly through the underside 236 and the exterior surface 284 of the body portion 250. The outer leg 294 of the vent passage 264 is generally an elongated blind bore extending horizontally into the body portion 250 to a bottom or end face 314 (FIG. 6). The vacuum sub-chamber 298 extends downward to laterally communicate with a mid-way point of the outer leg 294 via the inlet channel 296. The mid-leg 308 is accessed during manufacturing from the underside 236 and laterally through the inner leg 306 prior to placement of the plug 310. From this perspective the mid-leg 308 can be bored or displacement molded in the case of plastic injection molding to communicate laterally with the outer leg 294 near the end face 314.

The peripheral edge 282 of the diaphragm 256 seals between the exterior surface 244 of the body portion 250 and a generally annular gasket 286, and the gasket 286 is in sealed contact between the cover 274 and the peripheral edge 282. A series of threaded fasteners or screws 283 attach the cover 274 to the body portion 250 and compresses the peripheral edge 282 and gasket 286 between the cover 274 and body portion 250. To assist assembly, four alignment pins 287 project upwardly from the exterior surface 284 and extend snugly through corresponding holes 289 in the diaphragm 256, the gasket 286 and the cover 274, as best shown in FIG. 8.

Figure 10:
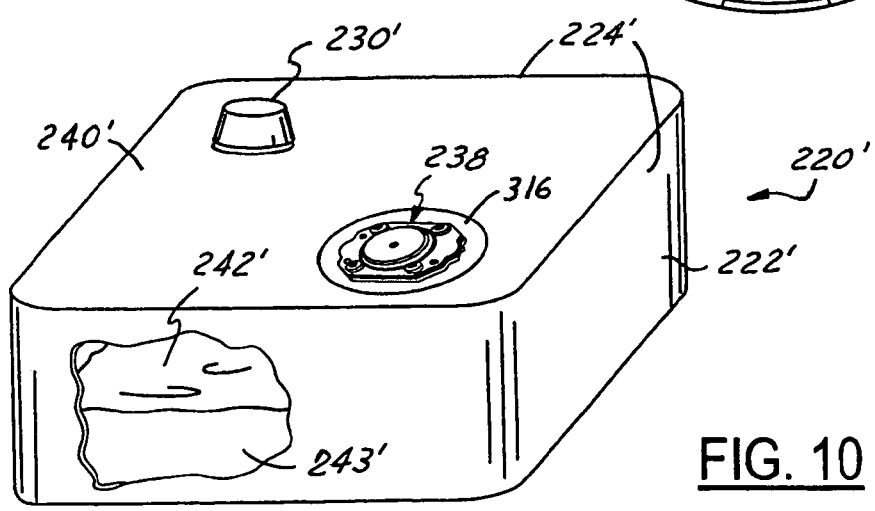
FIG. 10 is a perspective view of a fuel tank assembly with the pressure valve assembly mounted to a tank wall in accordance with another alternative embodiment of the present invention.

Referring to FIG. 10 a modification of the tank assembly 220' depicts the valve assembly 238' being separate from the cap 230' and may still communicate with a vapor dome portion (not shown but similar to that of FIG. 3) through the top portion 240' of the tank 222'. Consequently, the body portion 250' of the housing of the pressure valve assembly 238' is not integral to the filler cap 230' and instead is part of a flange 316 engaged sealably to the top portion 240' of the tank wall 224'. Although this modification would require an additional penetration through the tank wall 224', in some applications it may be desirable depending upon tank location, maintenance issues, appearance and the tank material (i.e. plastic or metal).

Figure 11:
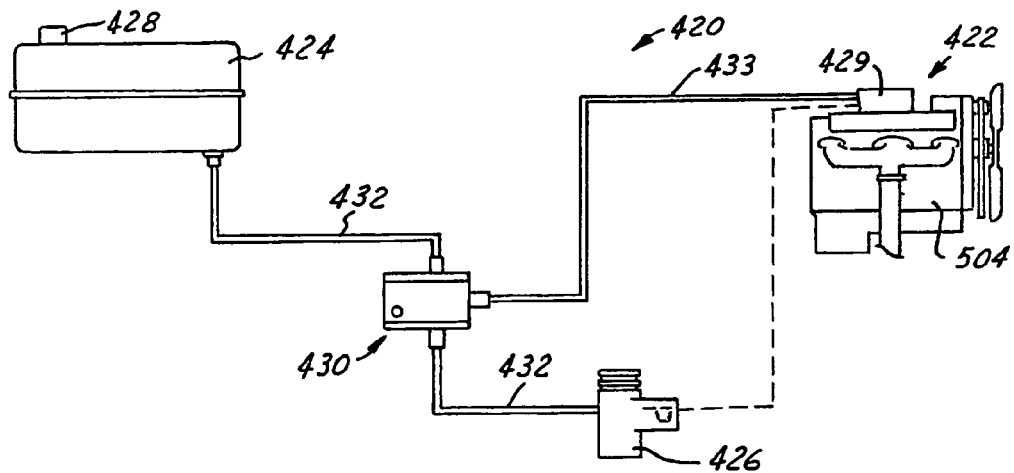
FIG. 11 is a schematic view of a fuel vapor control system according to a further embodiment of the present invention.

Referring in more detail to the drawings, FIG. 11 illustrates a fuel vapor control system 420 embodying the present invention and for a combustion engine 422. The vapor control system 420 limits the amount of fuel vapor released to atmosphere from an on-board fuel tank 424, and is preferably utilized in ground-base equipment applications such as lawn mowers, power washers, small off-road recreational vehicles and the like which utilize float-type carburetors 426.

Pressure in the fuel tank 424 of the vapor control system 420 is controlled by a two-way vent valve 428, such as that disclosed above with particular reference to the fuel cap 230 of FIGS. 3 through 10 and to the vented closure 92 of FIG. 1. The two-way vent valve 428 is normally biased closed but will automatically open and generally allow atmospheric air to flow freely into the tank when a tank vacuum develops, typically due to the consumption of fuel by the engine 422 when running. During conditions when tank pressure is controllably super-atmospheric, the two-way vent valve 428 will remain closed so as not to release fuel vapor to the atmosphere. However, if tank pressure exceeds a pre-determined threshold superatmospheric pressure, the vent valve 428 will automatically open to relieve internal pressure thus controllably releasing fuel vapor to the atmosphere from the tank 424. In this way, the two-way vent valve 428 acts to minimize fuel vapor release to the atmosphere from the pressurized tank 424.

Establishment of a threshold pressure set-point for the two-way vent valve 428 is generally limited by the structural and sealing or containment characteristics of the fuel system. To enhance this pressure containment and emission control ability during periods when the engine 422 is shutdown and tank pressure is super-atmospheric, a pneumatic fuel shut-off valve 430 of the vapor control system 420 isolates the tank 424 from the carburetor 426. The shut-off valve 430 is located in a fuel supply line 432 which flows fuel via gravity from the tank 424 to the float-type carburetor 426. The fuel shut-off valve 430 is just one example of the fuel shut-off valve 70 of FIG. 1. The shut-off valve 430 is normally biased closed and prevents the potential leakage of liquid fuel through the carburetor 426 from the pressurized tank 424, which would then evaporate and be released to atmosphere as fuel vapor. When the engine 422 is being started and/or running, the shut-off valve 430 automatically opens regardless of tank pressure allowing liquid fuel to flow controllably into the carburetor 426 so that an air/fuel mixture may flow through the carburetor 426 and into an intake manifold 429. Although not shown in FIG. 11, the carburetor 426 is mounted against the intake manifold 429 so that the air/fuel mixture flows directly therein.

The shut-off valve 430 is biased into a normally closed position and automatically opens to flow liquid fuel to the carburetor 426 upon a pneumatic pressure change from a dynamic pressure source which is preferably the vacuum producing intake manifold 429 of the engine 422 and sensed through a sensing line 433. Alternatives to the pressure change at the intake manifold 429 include an engine crankcase, or any other source producing pressure change which correlates to an engine start condition and continued operation. As used herein, the terminology pressure source encompasses an engine intake manifold, crankcase, and the like.

Figure 12:
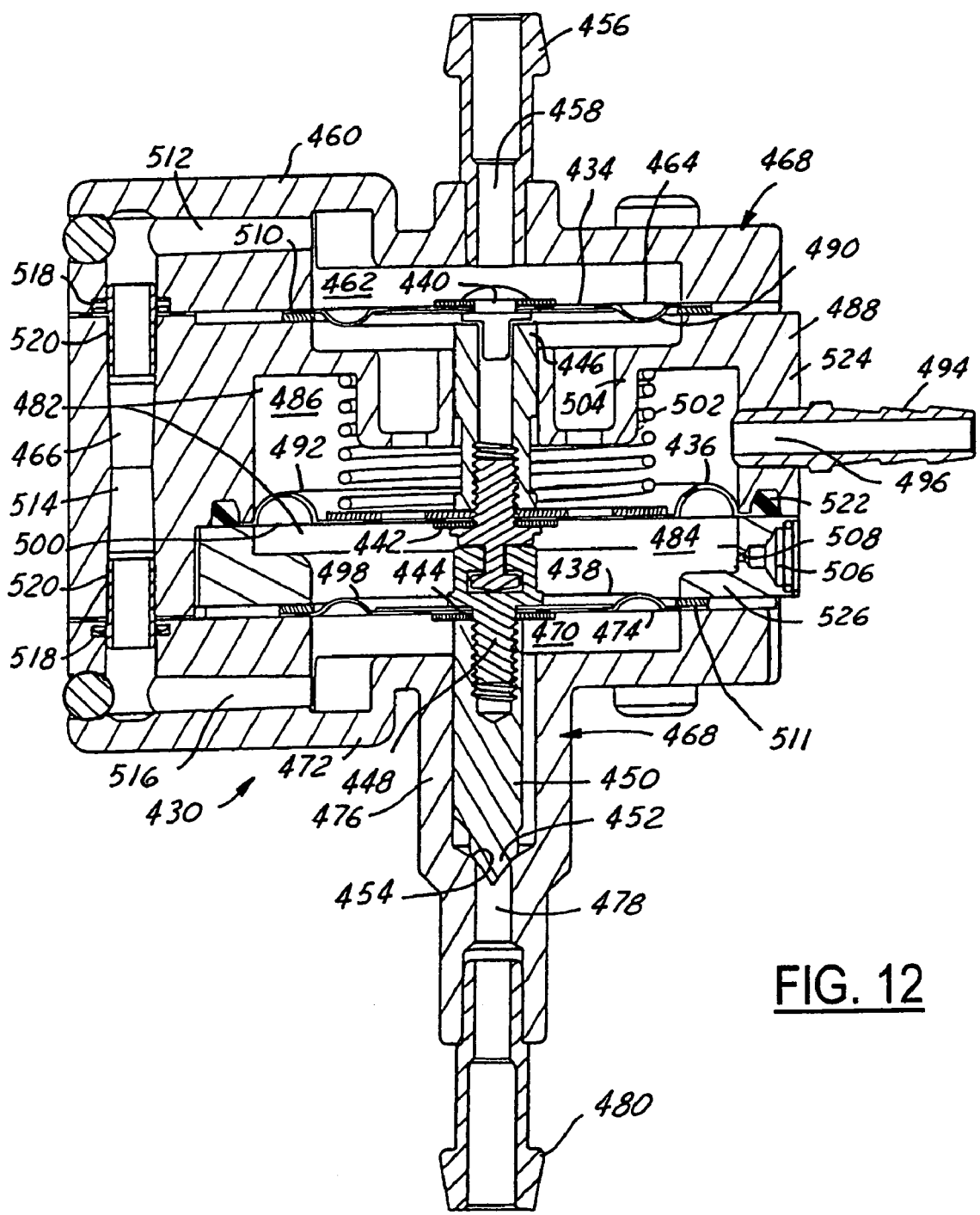
FIG. 12 is a cross-sectional view of a pneumatic fuel shut-off valve, for use with the embodiment of FIG. 11.

Referring now to FIG. 12, the shut-off valve 430 operates via simultaneous and co-directional flexing of three axially spaced resilient members or convoluted diaphragms 434, 436, 438 interlinked at their respective mid-points 440, 442, 444 by a common axially extending linkage 446 which is engaged at a bottom end 448 to a needle-type valve head 450 having a conical tip 452 for seating axially to a substantially annular valve seat 454 carried by a valve housing 468. When the valve 430 is open, the valve head 450 is spaced axially away from the seat 454 and liquid fuel flows through an inlet nozzle 456 which defines an inlet port 458 and projects upward from a top cover 460 of the housing 468. The inlet port 458 communicates with an inlet chamber 462 generally defined by the top cover 460 and a top side 464 of the inlet diaphragm 434. From the inlet chamber 462, fuel freely flows through a conduit 466 preferably defined by the housing 468 and into an outlet chamber 470 defined by a bottom cover 472 of the housing 468 and a bottom side 474 of the outlet diaphragm 438. From the outlet chamber 470, fuel flows axially downward in a sleeve 476 which projects downward from the bottom cover 472 for axially guiding the valve head 450. The sleeve 476 preferably carries the valve seat 454 which substantially faces upward for seating to the valve head 450. With the valve 430 open, the fuel flows past the seat 454 and through an outlet port 478 generally defined by an outlet nozzle 480 engaged concentrically to the sleeve 476, and into the carburetor 426.

Generally, the normally biased closed shut-off valve 430 opens via a differential pressure change experienced across the resilient dividing member or diaphragm 436 which sealably divides a dynamic chamber 482 into a reference or atmospheric sub-chamber 484 and a pressure or vacuum sub-chamber 486. The vacuum sub-chamber 486 is generally defined radially by a mid-body 488 of the housing 468, which is engaged to and located between the top and bottom covers 460, 472, and axially between a bottom side 490 of the inlet diaphragm 434 and a top side 492 of the dividing diaphragm 436. A vacuum fitting or nipple 494 supported by the mid-body 488 defines a vacuum port 496 which communicates between the vacuum sub-chamber 486 and the manifold 429 of the engine 422 via the sensing line 433 (referring to FIG. 11). Similarly, the reference sub-chamber 484 is generally defined radially by the mid-body 488 and axially between a top side 498 of the outlet diaphragm 438 and a bottom side 500 of the dividing diaphragm 436. The valve 430 is biased closed by a coiled compression spring 502 disposed in the vacuum sub-chamber 486 and compressed axially between the top side 492 of the dividing diaphragm 436 and a radially inward projecting structure or shoulder 504 of the mid-body 488. The shoulder 504 is spaced axially away from the bottom side 490 of the inlet diaphragm 434 so as not to obstruct flexing of the inlet diaphragm 434.

During operation, as vacuum increases in the vacuum sub-chamber 486, the dividing diaphragm 436 flexes upward into the vacuum sub-chamber 486 against the compression force of the spring 502 carrying with it the linkage 446 and co-extending needle-type valve head 450. As the dividing diaphragm 436 flexes into the vacuum sub-chamber 486, it simultaneously causes a top end of the linkage 446 to push and flex the inlet diaphragm 434 into the inlet chamber 462 and the bottom end 448 of the linkage 446 to simultaneously pull the outlet diaphragm 438 axially upward into the reference sub-chamber 484. Because the inlet and outlet chambers 462, 470 are in continuous communication with each other via the conduit 466, the lost volume in the inlet chamber 462 is offset by the gained volume in the outlet chamber 470, thus in effect, canceling each other out. Consequently, the valve head 450 is free to move axially upward away from the valve seat 454 without being substantially effected by tank pressure which is continuously exposed to the inlet and outlet chambers 462, 470.

During engine off or storage mode, the shut-off valve 430 is in the closed position and fuel at tank pressure is in the conduit 466 and inlet and outlet chambers 462, 470 applying the same pressure upon the inlet and outlet diaphragms 434, 438. This pressure exerts a downward force on inlet diaphragm 434 and an upward force on outlet diaphragm 438. These two forces acting upon the solid linkage 446 effectively cancel each other out. However, a small downward component net force does exist because the effective area of the outlet diaphragm 438 is generally reduced by the area of the needle seat 454. This and the added downward force of the compression spring 502 produces the total downward biasing force placed upon the valve head 450 to bias the valve closed. The head 450, however, is held in the closed position primarily due to the spring force provided by the spring 502 and is influenced negligibly by the component net force and thus negligibly by the fuel tank pressure.

During engine operation the vacuum generated in the intake manifold 429 or a crankcase 504 is transmitted through the sensing line 433 (referring to FIG. 11) to the vacuum sub-chamber 486 of the dynamic chamber 482 defined by the mid-body 488 and the inlet and dividing diaphragms 434, 436. Atmospheric pressure is transmitted through a filter screen 506, and passage 508 to the reference chamber 484 defined radially by mid-body 488 and outlet diaphragm 438 and dividing diaphragms 436. The atmospheric pressure acting on the bottom side 500 of the dividing diaphragm 436, being greater than the sub-atmospheric pressure acting on the top side 492 of the dividing diaphragm 436 results in a net upward force. Since the entire mechanism made up of all three diaphragms 434, 436, 438, linkage 446 and needle-type valve head 450 is free to move in the vertical direction against the force exerted by spring 502, once the net upward force caused by the pressure differential across dividing diaphragm 436 generally exceeds the force exerted by the spring 502, the mechanism will move upward axially spacing the valve head 450 from the seat 454 and allowing fuel to flow via gravity to the float-type carburetor 426. If fuel pressure builds in the tank 424 during engine operation, the pressure forces exerted on the inlet and outlet diaphragms 434, 438 are effectively balanced-out, canceling each other and causing neither a net opening or closing force of sufficient magnitude to influence the position of the valve head 450 relative to the seat 454. Preferably, to provide a highly responsive valve 430, the effective area of the dividing diaphragm 436 is substantially larger than the effective area of the inlet or outlet diaphragms 434, 438.

For ease of manufacturing and assembly, peripheries 510, 511 of the inlet and outlet diaphragms 434, 438 are compressed and sealed between top and bottom sections 524, 526 of the mid-body 488 and the respective top and bottom covers 460, 472. Each cover is engaged to opposite sides of the mid-body 488 by a series of threaded fasteners (not shown). A first portion 512 of the conduit 466 communicating with the inlet chamber 462 is defined by the top cover 460 of the housing 468, a communicating section or mid portion 514 of the conduit 466 is preferably defined by the mid-body 488, and a third portion 516 of the conduit 466 communicating between the mid portion 514 and the outlet chamber 470 is defined by the bottom cover 472. The interface of the first portion 512 with the mid portion 514 and the interface of the mid portion 514 with the third portion 516 are appropriately sealed to prevent fuel leakage via an o-ring or gasket 518 and preferably corresponding pressure fitted sleeves 520.

A periphery 522 of the dividing diaphragm 436 is preferably sealed continuously between the top and bottom sections 524, 526 of the mid-body 488. Preferably, the top section 524 radially defines the vacuum sub-chamber 486 and supports the vacuum nozzle 494 and the bottom section 526 radially defines the reference chamber 484 and defines the reference passage 508. The top and bottom sections 524, 526 are held firmly together by the same threaded fasteners that hold the bottom cover 472 to the mid-body 488.

Figure 13:
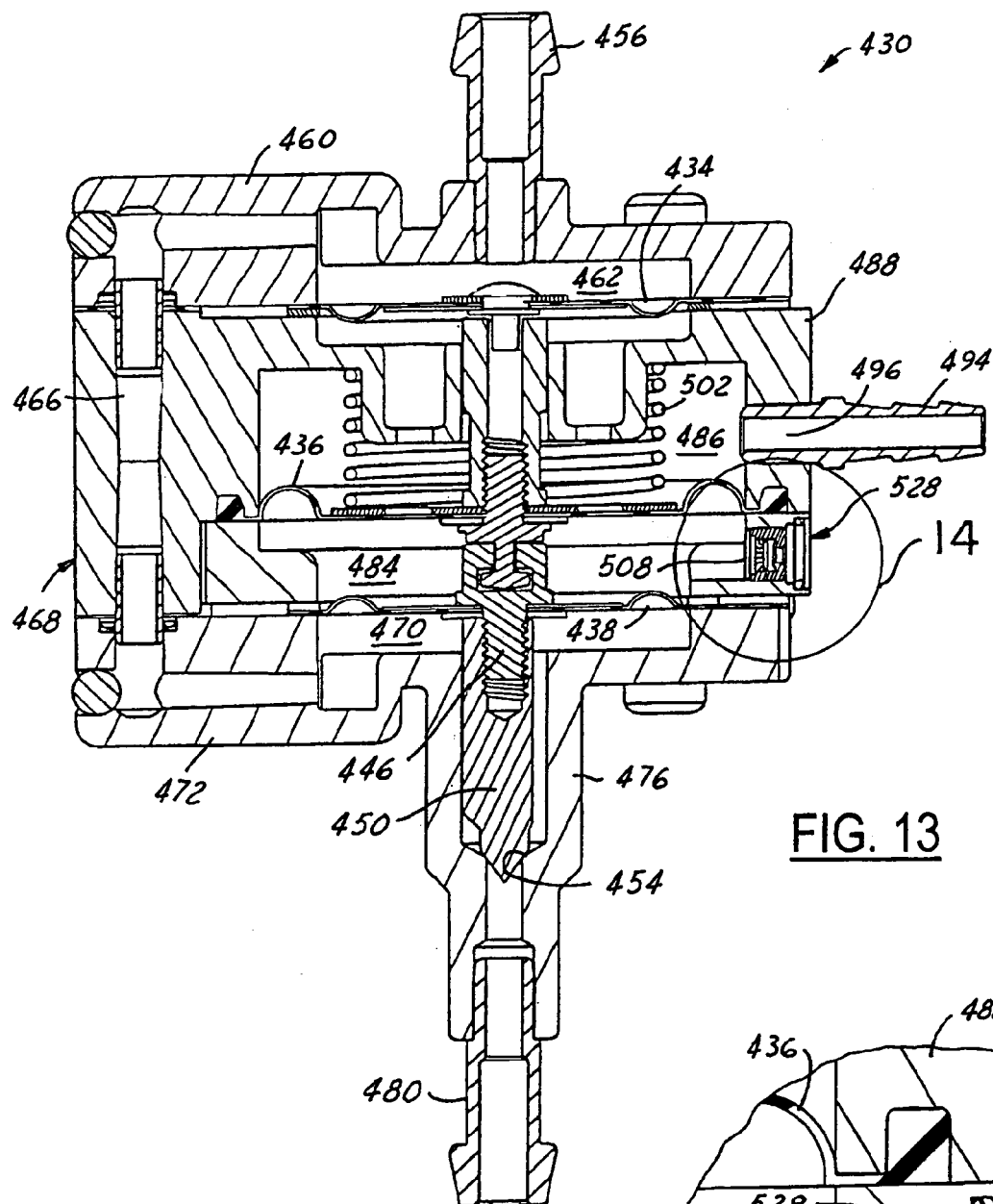
FIG. 13 is a cross-sectional view of a modified fuel shut-off valve similar to FIG. 12 except having a check valve in a vent passage to a reference sub-chamber.
Figure 14:
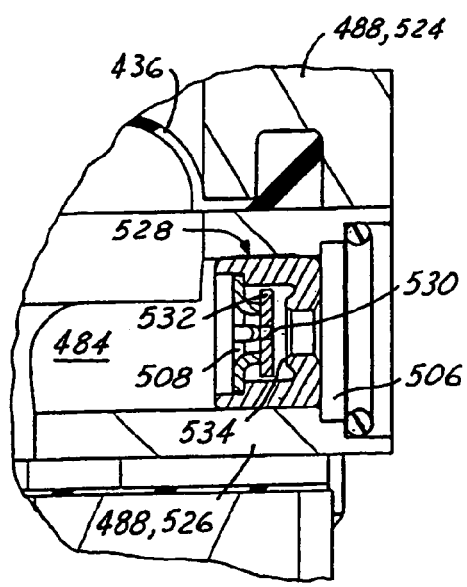
FIG. 14 is an enlarged, fragmentary cross-sectional view of the encircled portion 14 in FIG. 13.

The above embodiment of the present invention is preferable for operating engines having at least two cylinders which create a fairly steady vacuum. However, single cylinder engines typically have a very unsteady vacuum source because they are often started by hand cranking (rope pulling) and operate at extreme speed, or RPM's, and load variations. FIGS. 13 and 14 illustrate an addition to the present invention of a one way check valve 528 illustrated in an open position and mounted in the atmospheric vent passage or port 508 leading to the reference sub-chamber 484. This check valve 528, is free flowing leading into the sub-chamber 484, and has a pin hole or restricting orifice 530 extending through a disc-like head 532 which seats to annular valve seat 534 of the check valve 528 for limiting air flow exiting the sub-chamber 484. Preferably, the diameter of the restricting orifice 530 ranges from approximately 0.0001 inch to 0.005 inches.

During cranking or other operation of a single cylinder engine 422 when the vacuum pulses are weak and of a low frequency (2–20/sec), the vacuum pulse will move the dividing diaphragm 436 upward, opening the valve head 450 and pulling air into sub-chamber 484. However, during the time between vacuum pulses dividing diaphragm 436 does not immediately return to its normal position which would seat the valve head 450, because the check valve 528 closes preventing the reference air in sub-chamber 484 from quickly evacuating to the atmosphere. Any air evacuation is limited to that flowing through restricting orifice 530 which is sized to prevent substantial valve closure between vacuum pulses.

Figure 15:
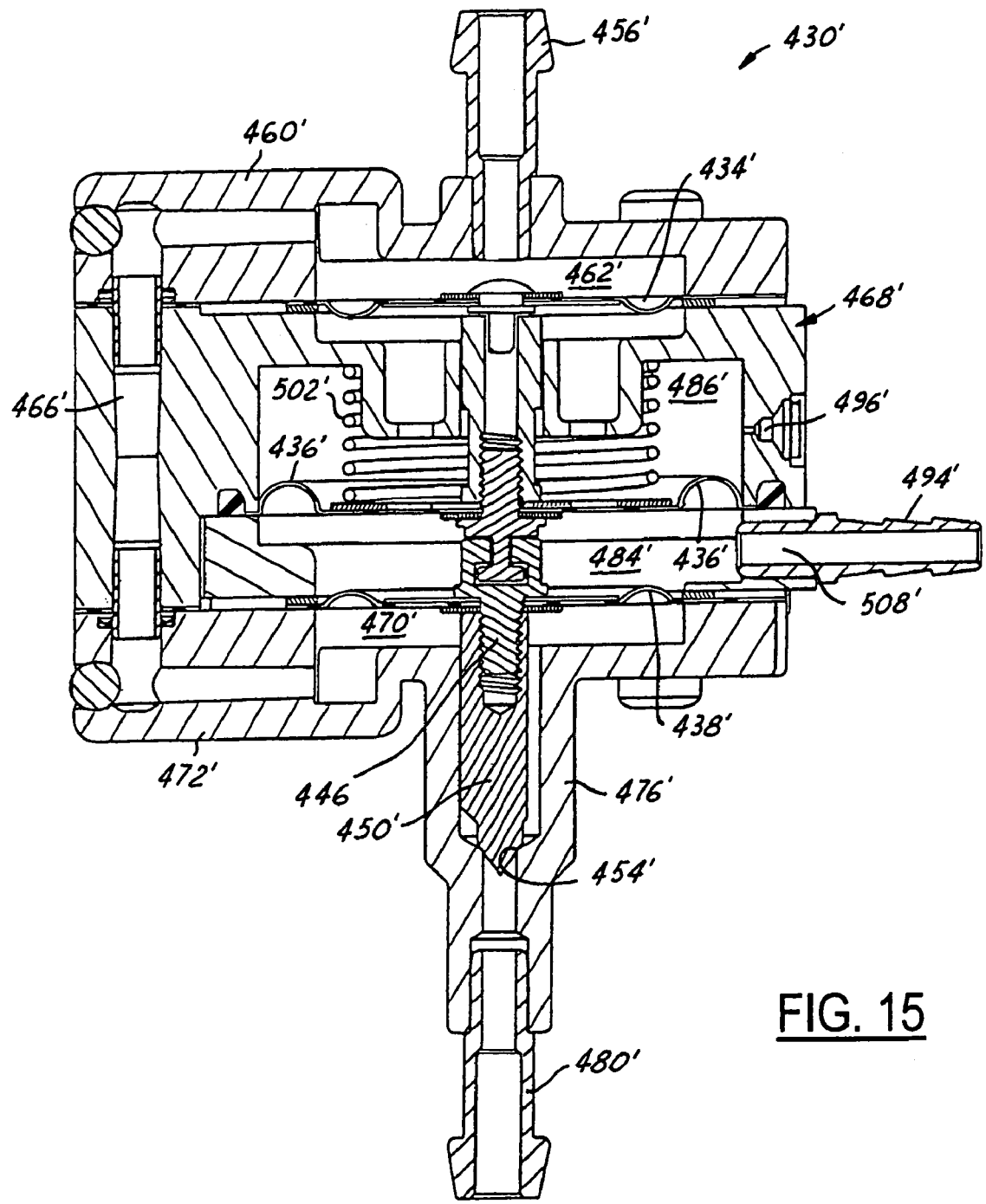
FIG. 15 is a cross-sectional view of a modified fuel shut-off valve similar to FIG. 12 except that a reference sub-chamber and sub-pressure chamber are reversed.

A modification to the above described embodiment is illustrated in FIG. 15 wherein the sub-chambers 484, 486 of the dynamic chamber 482 of the valve 430 are essentially reversed to create a positive pressure actuated shut-off valve 430'. By reversing, the modified sub-chamber 486' is the reference and the modified sub-chamber 484' is the pressure chamber. Correspondingly, the vacuum port 496 becomes a reference port 496' and the reference port 508 of the valve 430 becomes a super-atmospheric pressure port 508'. Sub-chamber 484' receives super-atmospheric pressure from a dynamic pressure source, which is preferably the vacuum producing intake manifold of the engine, in order to open the shut-off valve 430'.

For the pressure actuated version of the shut-off valve 430', illustrated in FIG. 15, the one way check valve 528 and restricting orifice or pin hole 530, shown in FIG. 14, can be added to valve 430' but with a reverse flow pattern from that described for valve 430, thus preventing atmospheric air from entering reference sub-chamber 486' between engine pressure pulses. This configuration aids in starting and unsteady engine operation in the same manner as described for the vacuum version except that reference air flow rate is greatly reduced when entering sub-chamber 486' preventing quick return movement (closing of valve 430') between pressure pulse signals.

In both modifications, a second one way check valve (not shown) could be mounted in the vacuum or pressure ports 496, 508' with a pin hole 530 restricting venting in the opposite direction. This second check valve could be used in addition to or replacing the first check valve and accomplish the delay closing function.

Figure 17:
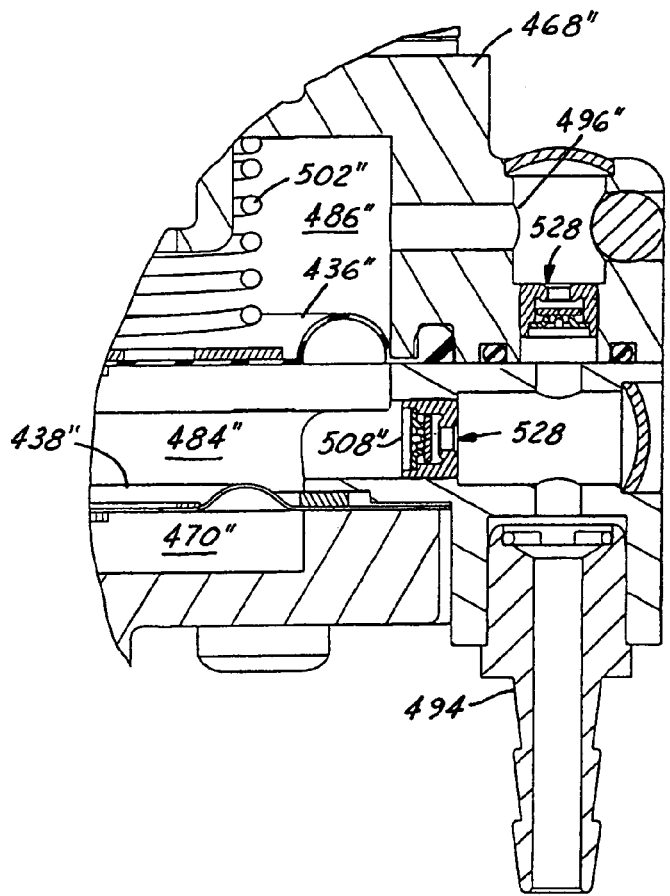
FIG. 17 is an enlarged, fragmentary cross-sectional view of the encircled portion 17 in FIG. 16.
Figure 16:
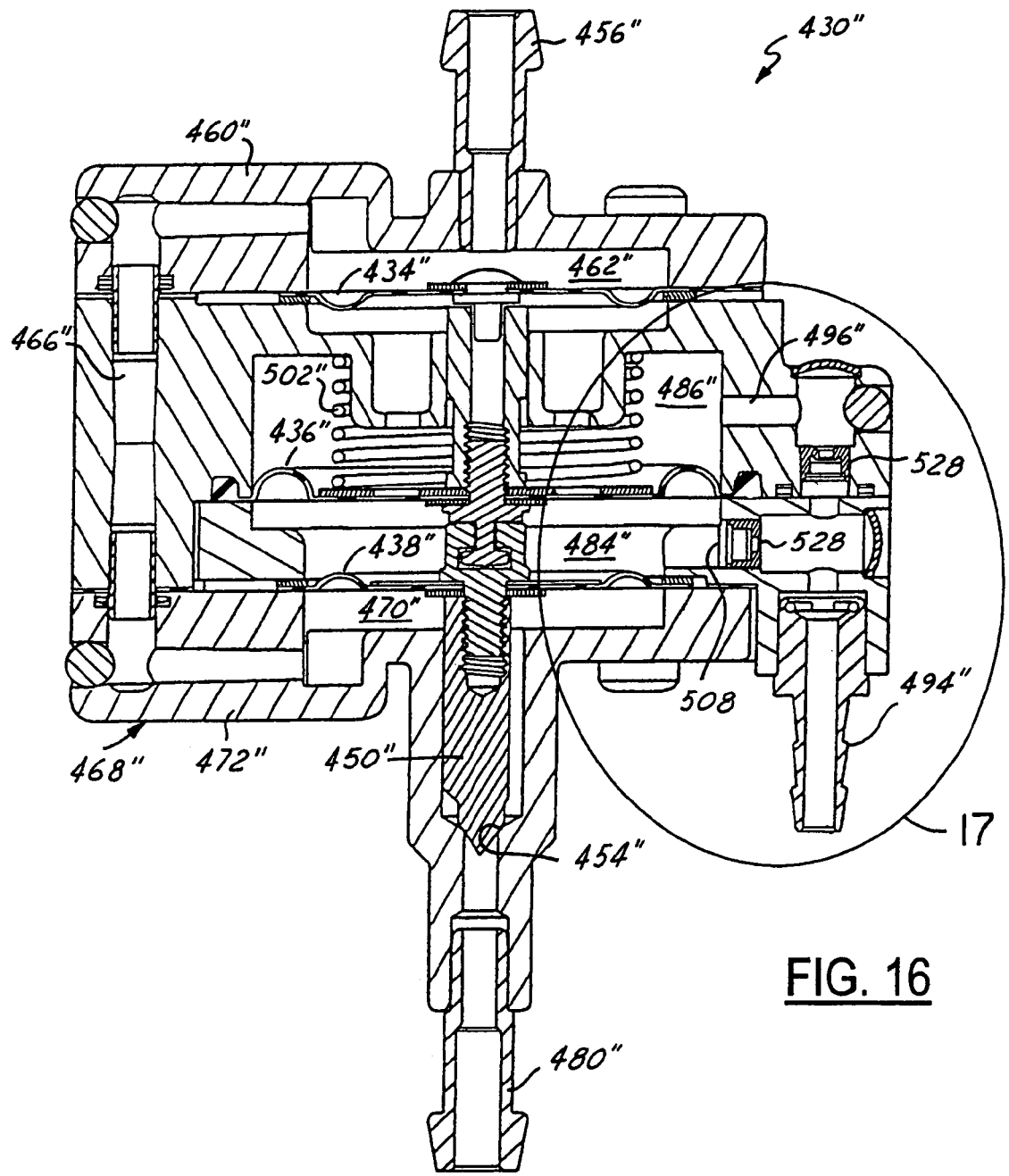
FIG. 16 is a cross-sectional view of a modified fuel shut-off valve similar to FIG. 13 except having a second check valve leading to a pressure sub-chamber and being particularly well adapted for use with the embodiment of FIG. 1.

Referring to FIGS. 16 and 17, yet another modification is illustrated using two one-way check valves 528. Referring now also to FIG. 14, the check valve 528 of FIG. 17 has a pin hole or restricting orifice 530 extending through a disc-like head 532 which seats to annular valve seat 534 of the check valve 528. This modified shut-off valve 430" is intended for use when the generated pulse is from the crankcase 504 of the four or two stroke engine 422 which produces both a vacuum and a pressure component for each revolution of the engine 422. The vacuum component of the engine pulse is routed and valved to vacuum sub-chamber 486" and the pressure component is routed and valved to pressure sub-chamber 484". In this configuration the vacuum component of the pulse is holding the shut-off valve 430" open during one portion of each engine revolution, and the pressure component of the pulse is holding the valve 430″ open during the opposite portion of each engine revolution. In this modification, the pin hole 530 holds the valve 430″ open during the portion of the pulse when the signal is switching between positive and vacuum, and therefore the size of the pin hole 530 is much less influential relative to the other modifications.

Referring in general to FIGS. 11 through 17, the shut-off valves 430, 430', 430″ each provide a positive shut-off of the fuel line 432 between the fuel tank 424 and the carburetor 426, regardless of internal tank pressure, the valves can be mounted on or in the fuel tank 424, anywhere in the fuel line 432, up or down stream of the fuel pump, on the carburetor 426 or integral with the carburetor 426. The shut-off valves and fuel pump can be made as one unit with a single manifold crankcase pulse line 433 to the assembly. This shut-off valve fuel pump assembly can then be mounted on or in the fuel tank 424, anywhere in the fuel line 432, on the carburetor 426 or integral with the carburetor.

In conclusion, the method, fuel system, and components of the present invention enable a reduction in the quantity of fuel vapor losses to the atmosphere during equipment shutdown and storage, without necessarily requiring a carbon canister vapor recovery system. In prior art systems, a fuel tank is freely bi-directionally vented to permit vapors to escape during storage and thereby prevent pressure build up within the fuel tank. In some prior art systems, a fuel tank is uni-directionally vented to prevent vapors to escape during storage. Undesirably, however, pressure builds up within the tank and tends to overwhelm the float valve of the carburetor, thereby flooding the carburetor and creating evaporative emissions. In other prior art systems, a bi-directional vent on the fuel tank is connected to a carbon canister to temporarily capture the vapors, thereby preventing the vapors from escaping to the atmosphere. Carbon canisters, however, are undesirable for a number of reasons.

As defined herein, the term atmosphere is broadly construed to include not only the gaseous mass surrounding the earth but also any vessel, chamber, or the like, which may be open or fluidically communicated to the atmosphere. The term vacuum is synonymous with negative pressure, sub-atmospheric pressure, and the like. The term positive pressure is synonymous with super-atmospheric pressure, and the like. The term "mitigate" means to limit, lessen, or reduce the quantity of evaporative emissions than would otherwise be possible in the absence of one or more aspects of the present invention. The term operation encompasses an apparatus that is functioning and the term inoperation encompasses an apparatus that is not currently functioning or is not currently intended to be functioning. But the term inoperation does not mean that the apparatus is broken or otherwise unable to be operated. The terminology check valve means a device for automatically preventing, limiting, or restricting flow in a conduit or the like.

While certain preferred embodiments have been shown and described, ordinarily skilled persons will readily recognize that the preceding description has been set forth in terms of description rather than limitation, and that various modifications and substitutions can be made without departing from the spirit and scope of the invention. Of course, still other modifications or substitutions can be made within the spirit and scope of the invention. The invention is defined by the following claims.

What is claimed is:

1. A method of delivering fuel from a fuel tank in fluid communication with a float bowl carburetor of an internal combustion engine, so as to mitigate evaporative emissions of said fuel from at least one of said fuel tank and said float bowl carburetor, said method comprising the steps of:
   (a) containing said fuel within said fuel tank, said fuel including liquid fuel and fuel vapors;
   (b) during operation of said internal combustion engine, permitting fluid communication of said liquid fuel between said fuel tank and said float bowl carburetor, and
   permitting outward venting of said fuel vapors from said fuel tank through a diaphragm-type pressure relief valve substantially only when pressure within said fuel tank exceeds a predetermined threshold superatmospheric pressure greater than three psi therein; and
   (c) during inoperation of said internal combustion engine, preventing fluid communication of said liquid fuel between said fuel tank and said float bowl carburetor, and
   permitting outward venting of said fuel vapors from said fuel tank substantially when pressure within said fuel tank exceeds a predetermined threshold super-atmospheric pressure therein.

2. The method of claim 1 further comprising the step of permitting inward venting of the atmosphere into said fuel tank during operation and inoperation of said engine.

3. The method of claim 2 wherein said step of permitting inward venting includes providing a fuel cap for said fuel tank, wherein said fuel cap includes at least one check valve for permitting outward venting.

4. The method of claim 1 wherein said steps of permitting and preventing fluid communication of said liquid fuel are carried out by an automatically-actuated shutoff valve.

5. The method of claim 4 wherein said fuel shutoff valve is fluidically communicated with, and actuated by pressure pulses from, an engine crankcase.

6. The method of claim 5 further comprising the step of pumping said liquid fuel to said carburetor with an automatically-actuated fuel pump.

7. The method of claim 6 wherein said fuel pump is fluidically communicated with, and actuated by pressure pulses from, said engine crankcase.

8. The method of claim 7 further comprising the step of locating said fuel pump downstream of said fuel shutoff valve between said carburetor and said fuel shutoff valve.

9. A fuel system having a fuel tank in fluid communication with a float-bowl carburetor of an internal combustion engine, said fuel system comprising:
   a fuel tank containing a supply of liquid fuel and fuel vapor, and having a liquid fuel outlet and a fuel vapor outlet;
   a diaphragm-type pressure relief vent valve in fluid communication with said fuel vapor outlet, and permitting said fuel vapor to exit said fuel tank through said fuel vapor outlet substantially only when pressure within said fuel tank reaches a predetermined threshold super-atmospheric pressure greater than three psi, and permitting inward venting of the atmosphere into said fuel tank through said fuel vapor outlet; and
   a fuel shutoff valve having a liquid outlet in at least indirect fluid communication with said float bowl carburetor, and a liquid inlet in communication with said liquid fuel outlet of said fuel tank;
   said fuel shutoff valve being operable to an open position during operation of said internal combustion engine so as to permit flow of said liquid fuel therethrough, said fuel shutoff valve being operable to a closed position during inoperation of said internal combustion engine so as to prevent flow of said liquid fuel therethrough.

10. The fuel system of claim 9 further comprising a fuel cap mounted to a portion of said fuel tank wherein said vent valve is integrated into said fuel cap.

11. The fuel system of claim 9 wherein said fuel shutoff valve is an automatically-actuated device.

12. The fuel system of claim 11 wherein said fuel shutoff valve is fluidically communicated with, and actuated by pressure pulses from, a crankcase of said engine.

13. The fuel system of claim 12 further comprising an automatically actuated fuel pump in fluid communication with said float bowl carburetor.

14. The fuel system of claim 13 wherein said fuel pump is fluidically communicated with, and actuated by pressure pulses from, said crankcase.

15. The fuel system of claim 14 wherein said fuel pump is located downstream of said fuel shutoff valve between said float bowl carburetor and said fuel shutoff valve.

16. The fuel system of claim 9, wherein said vent valve includes:
a diaphragm-type pressure relief valve constructed and arranged to relieve said fuel tank of super-atmospheric pressure, and
a vacuum relief valve constructed and arranged to relieve said fuel tank of sub-atmospheric pressure.

17. A fuel system having a fuel tank in fluid communication with a float-bowl carburetor of an internal combustion engine, said fuel system comprising:
a fuel tank containing a supply of liquid fuel and fuel vapor, and having a liquid fuel outlet and a fuel vapor outlet;
a vent valve in fluid communication with said fuel vapor outlet, and permitting said fuel vapor to exit said fuel tank through said fuel vapor outlet substantially when pressure within said fuel tank reaches a predetermined threshold superatmospheric pressure, wherein said vent valve includes:
a diaphragm-type pressure relief valve constructed and arranged to relieve said fuel tank of super-atmospheric pressure, and
a vacuum relief valve constructed and arranged to relieve said fuel tank of sub-atmospheric pressure;
a body;
a cover engaged to the body;
said pressure relief valve carried by the body and having;
a diaphragm having a peripheral edge engaged sealably between the body and the cover, a first side and an opposite second side,
a reference chamber defined between the cover and the first side,
a pressure chamber defined between the second side and the body and communicating with the fuel storage cavity,
a compression spring disposed in the reference chamber and compressed yieldably between the cover and the first side,
a valve seat carried by the body,
a valve head disposed in the pressure chamber, coupled to the diaphragm, and biased sealably against the valve seat by the compression spring, and
a vent passage defined by the body, communicating between the pressure chamber and atmosphere, and interposed by the valve head at the valve seat; and said vacuum vent valve being carried by the body and having;
a vacuum valve head,
a vacuum valve seat carried by the body, and
a vacuum channel defined by the body, communicating between atmosphere and the fuel storage cavity, and being interposed by the vacuum valve head and seat; and
a fuel shutoff valve having a liquid outlet in at least indirect fluid communication with said float bowl carburetor, and a liquid inlet in communication with said liquid fuel outlet of said fuel tank;
said fuel shutoff valve being operable to an open position during operation of said internal combustion engine so as to permit flow of said liquid fuel therethrough, said fuel shutoff valve being operable to a closed position during inoperation of said internal combustion engine so as to prevent flow of said liquid fuel therethrough.

18. The fuel system of claim 17 wherein the vacuum valve head is disc shaped and disposed generally horizontally.

19. The fuel system of claim 17 wherein the valve head is of a needle-type and having a conical tip projecting downward to sealably contact the valve seat of the pressure control valve.

20. The fuel system of claim 9 wherein said fuel shutoff valve comprises a biased closed pneumatic fuel shut-off valve oriented between said fuel tank and said carburetor, said shut-off valve having a dynamic chamber communicating with a pressure source, a flexible diaphragm disposed operatively in said dynamic chamber and being responsive to vacuum pressure from said pressure source, and a valve head engaged to said diaphragm.

21. A fuel system having a fuel tank in fluid communication with a float-bowl carburetor of an internal combustion engine, said fuel system comprising:
a fuel tank containing a supply of liquid fuel and fuel vapor, and having a liquid fuel outlet and a fuel vapor outlet;
a vent valve in fluid communication with said fuel vapor outlet, and permitting said fuel vapor to exit said fuel tank through said fuel vapor outlet substantially when pressure within said fuel tank reaches a predetermined threshold superatmospheric pressure; and
a fuel shutoff valve having a liquid outlet in at least indirect fluid communication with said float bowl carburetor, and a liquid inlet in communication with said liquid fuel outlet of said fuel tank, wherein said fuel shutoff valve comprises:
a biased closed pneumatic fuel shut-off valve oriented between said fuel tank and said carburetor, said shut-off valve having a dynamic chamber communicating with a pressure source;
a flexible diaphragm disposed operatively in said dynamic chamber and being responsive to vacuum pressure from said pressure source; and
a valve head engaged to said diaphragm;
a housing;
a resilient inlet member supported by said housing;
a resilient outlet member supported by said housing;
said flexible diaphragm being supported by said housing and spaced between said inlet and outlet members;
an inlet chamber defined between said housing and said inlet member;
an outlet chamber defined between said housing and said outlet member;

a conduit communicating between said inlet and outlet chambers;

said dynamic chamber being defined between said inlet and outlet members, said dynamic chamber being divided sealably by said flexible diaphragm into a first and second sub-chamber;

a first pressure port defined by said housing and communicating between a first pressure source and said first sub-chamber;

a second pressure port defined by said housing and communicating between a second pressure source and said second sub-chamber;

an inlet port extending through said housing and communicating with said inlet chamber; and an outlet port extending through said housing and communicating with said outlet chamber when said shut-off valve is open and being isolated from said outlet chamber when said shut-off valve is closed;

said fuel shutoff valve being operable to an open position during operation of said internal combustion engine so as to permit flow of said liquid fuel therethrough, said fuel shutoff valve being operable to a closed position during inoperation of said internal combustion engine so as to prevent flow of said liquid fuel therethrough.

22. The fuel system of claim 21 wherein a pressure differential between said first and second pressure sources acts to flex said resilient inlet and outlet members, and open said shut-off valve.

23. The fuel system of claim 22 wherein said resilient inlet and outlet members are diaphragms.

24. The fuel system of claim 22 wherein said shut-off valve further comprises:

a compression spring disposed in the first sub-chamber for biasing the dividing member toward the second sub-chamber;

the first sub-chamber being a constant pressure reference chamber; and the second sub-chamber being a dynamic super-atmospheric chamber.

25. The fuel system of claim 22 wherein the first pressure chamber is a vacuum chamber and the second pressure chamber is a super-atmospheric pressure chamber.

26. A pneumatic shut-off valve, comprising:

a housing;

a resilient inlet member supported by the housing;

a resilient outlet member supported by the housing;

a resilient dividing member supported by the housing and spaced between the inlet and outlet members;

an inlet chamber defined at least in part between the housing and the inlet member;

an outlet chamber defined at least in part between the housing and the outlet member;

a conduit communicating between the inlet and outlet chambers;

a dynamic chamber defined between the inlet and outlet members, and being divided sealably by the dividing member into a first and a second sub-chamber;

a first pressure port defined by the housing and communicating between a first pressure source and the first sub-chamber;

a second pressure port defined by the housing and communicating between a second pressure source and the second sub-chamber;

an inlet port communicating with the inlet chamber; and an outlet port communicating with the outlet chamber when the shut-off valve is open and being isolated from the outlet chamber when the shut-off valve is closed.

27. The pneumatic shut-off valve set forth in claim 26 wherein the dynamic chamber maintains constant volume regardless of pressure within the first and second sub-chambers.

28. The pneumatic shut-off valve set forth in claim 26 wherein a pressure differential between the first and second pressure sources acts to flex the dividing inlet and outlet members, and open the shut-off valve.

29. The pneumatic shut-off valve set forth in claim 28 comprising a linkage connected to the inlet member, the dividing member and the outlet member.

30. The pneumatic shut-off valve set forth in claim 29 comprising:

a valve seat carried by the housing; and a valve head connected to the linkage and being seated to the valve seat when the shut-off valve is closed and being spaced from the valve seat when the shut-off valve is open.

31. The pneumatic shut-off valve set forth in claim 30 wherein the linkage extends through the first and second sub-chambers, and the valve head projects from the linkage and through the outlet chamber.

32. The pneumatic fuel shut-off valve set forth in claim 28 wherein the first sub-chamber is a vacuum chamber and the first pressure source is an intake manifold of a combustion engine.

33. The pneumatic shut-off valve set forth in claim 31 wherein the first sub-chamber is a vacuum chamber and the first pressure source is an intake manifold of a combustion engine.

34. The pneumatic shut-off valve set forth in claim 32 wherein the second sub-chamber is an atmospheric reference chamber and the second pressure source is atmosphere.

35. The pneumatic shut-off valve set forth in claim 33 wherein the second sub-chamber is an atmospheric reference chamber and the second pressure source is atmosphere.

36. The pneumatic shut-off valve set forth in claim 28 wherein the second sub-chamber is an atmospheric reference chamber and the second pressure source is atmosphere.

37. The pneumatic shut-off valve set forth in claim 28 wherein the inlet and outlet chambers contain liquid fuel flowing from a variable pressure fuel tank.

38. The pneumatic shut-off valve set forth in claim 37 wherein the outlet port communicates with a float-type carburetor.

39. The pneumatic shut-off valve set forth in claim 28 wherein the first, dividing, and second members are resilient diaphragms.

40. The pneumatic shut-off valve set forth in claim 31 wherein the first, dividing, and second members are flexible diaphragms.

41. The pneumatic shut-off valve set forth in claim 35 wherein the first, dividing, and second members are flexible diaphragms.

42. The pneumatic shut-off valve set forth in claim 41 comprising:

a support structure of the housing disposed in the vacuum chamber and spaced between the inlet diaphragm and the dividing diaphragm; and a coiled compression spring disposed in the vacuum chamber and compressed between the support structure and the dividing diaphragm for biasing the inlet diaphragm toward the vacuum chamber, the dividing diaphragm toward the reference chamber, and the outlet diaphragm toward the outlet chamber thus driving the linkage and valve head against the seat.

43. The pneumatic shut-off valve set forth in claim 42 wherein a force induced by a vacuum in the vacuum chamber and exerted upon the dividing diaphragm causes the spring to compress and the linkage to carry the inlet diaphragm into the inlet chamber, the dividing diaphragm into the vacuum chamber and the outlet diaphragm into the reference chamber, and causes the valve head to be carried with the linkage away from the seat opening the shut-off valve.

44. The pneumatic shut-off valve set forth in claim 34 comprising a check valve positioned in the second pressure port and being constructed and arranged to freely flow atmospheric air into the reference chamber.

45. The pneumatic shut-off valve set forth in claim 44 comprising a restricting orifice communicating between the reference chamber and atmosphere to control the rate of air flowing out of the reference chamber.

46. The pneumatic shut-off valve set forth in claim 28 comprising:
    a compression spring disposed in the first sub-chamber for biasing the dividing member toward the second sub-chamber;
    the first sub-chamber being a constant pressure reference chamber; and
    the second sub-chamber being a dynamic super-atmospheric chamber.

47. The pneumatic shut-off valve set forth in claim 46 comprising a check valve positioned in the first pressure port and being constructed and arranged to flow reference air freely out of the reference chamber.

48. The pneumatic shut-off valve set forth in claim 47 comprising a restricting orifice communicating between the reference chamber and atmosphere to control the rate of atmospheric air flowing into the reference chamber.

49. The pneumatic shut-off valve set forth in claim 28 comprising:
    the first pressure chamber being a vacuum chamber; and
    the second pressure chamber being a super-atmospheric pressure chamber.

50. The pneumatic shut-off valve set forth in claim 49 comprising:
    a first check valve positioned in the first pressure port and being constructed and arranged to freely flow air out of the vacuum chamber; and
    a second check valve positioned in the second pressure port and being constructed and arranged to freely flow air into the super-atmospheric chamber.

51. The pneumatic shut-off valve set forth in claim 50 comprising:
    a first restricting orifice communicating between the vacuum chamber and atmosphere to control the rate of atmospheric air flowing into the vacuum chamber; and
    a second restricting orifice communicating between the super-atmospheric chamber and atmosphere to control the rate of air flowing from the super-atmospheric chamber to atmosphere.

52. The pneumatic shut-off valve set forth in claim 51 wherein the first and second pressure ports communicate with a crankcase of a combustion engine.

53. The pneumatic shut-off valve set forth in claim 39 wherein the inlet diaphragm is substantially smaller than the dividing diaphragm and the outlet diaphragm is substantially smaller than the dividing diaphragm.

54. The pneumatic shut-off valve set forth in claim 53 wherein the inlet and outlet diaphragms are substantially the same size.

* * * * *